(12) United States Patent
Belfoure et al.

(10) Patent No.: US 9,390,088 B2
(45) Date of Patent: Jul. 12, 2016

(54) ENSURING ACCESS TO LONG-TERM STORED ELECTRONIC DOCUMENTS

(71) Applicant: International Business Machines Corporation, Armonk, NY (US)

(72) Inventors: Vincent A. Belfoure, Lakewood, CO (US); Gregory J. Boss, Saginaw, MI (US); John E. Moore, Jr., Brownsburg, IN (US); Harald Veser, Leinfelden (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 13/867,578

(22) Filed: Apr. 22, 2013

(65) Prior Publication Data
US 2014/0317610 A1 Oct. 23, 2014

(51) Int. Cl.
*G06F 9/44* (2006.01)
*G06F 17/30* (2006.01)
*G06F 15/16* (2006.01)
*G06F 11/14* (2006.01)
*G06F 9/445* (2006.01)

(52) U.S. Cl.
CPC ............ *G06F 17/30011* (2013.01); *G06F 8/60* (2013.01); *G06F 8/62* (2013.01)

(58) Field of Classification Search
CPC ................... G06F 9/00–9/06; G06F 8/70–8/73
See application file for complete search history.

(56) References Cited

U.S. PATENT DOCUMENTS

| 5,842,866 | A | 12/1998 | Chow |
| 7,207,003 | B1 | 4/2007 | Berstis et al. |
| 7,398,464 | B1 | 7/2008 | Wei et al. |
| 7,512,905 | B1 | 3/2009 | Scott |
| 8,015,193 | B2 * | 9/2011 | Green et al. ................ 707/749 |
| 2002/0059335 | A1 | 5/2002 | Jelbert |
| 2003/0005108 | A1 * | 1/2003 | Bartley et al. ................ 709/224 |
| 2003/0135524 | A1 | 7/2003 | Cane et al. |
| 2005/0091214 | A1 * | 4/2005 | Probert .................. G06F 21/31 |
| 2005/0091658 | A1 * | 4/2005 | Kavalam et al. .............. 718/104 |
| 2005/0193032 | A1 * | 9/2005 | Barritz et al. ................ 707/200 |
| 2005/0210083 | A1 | 9/2005 | Kodama |
| 2005/0289513 | A1 * | 12/2005 | Chen ........................ G06F 8/62 717/121 |
| 2007/0067294 | A1 | 3/2007 | Ward et al. |
| 2007/0245409 | A1 * | 10/2007 | Harris et al. ...................... 726/5 |
| 2007/0250610 | A1 | 10/2007 | Haun et al. |
| 2008/0103723 | A1 | 5/2008 | Burdett et al. |
| 2008/0126803 | A1 | 5/2008 | Ginter et al. |
| 2010/0161773 | A1 | 6/2010 | Prahlad et al. |
| 2010/0275252 | A1 * | 10/2010 | Yun .................................. 726/7 |
| 2011/0314071 | A1 | 12/2011 | Johnson et al. |

(Continued)

OTHER PUBLICATIONS

IBM, "Method, Process and Framework Supporting Long Term Preservation of Data", IP.com, Jan. 19, 2005, pp. 1-3.

(Continued)

*Primary Examiner* — Philip Wang
*Assistant Examiner* — Mohammad Kabir
(74) *Attorney, Agent, or Firm* — Scully, Scott, Murphy & Presser, P.C.; Jennifer Davis, Esq.

(57) ABSTRACT

Mechanisms are provided for ensuring access to long-term stored electronic documents. In one example, one or more systems may provide for automatically ensuring access to long-term stored electronic documents. In another example, one or more algorithms may provide for automatically ensuring access to long-term stored electronic documents.

18 Claims, 32 Drawing Sheets

(56) References Cited

U.S. PATENT DOCUMENTS

| | | | |
|---|---|---|---|
| 2012/0254364 A1 | 10/2012 | Vijayan | |
| 2012/0297311 A1* | 11/2012 | Duggal | G06F 9/468 715/740 |
| 2012/0303740 A1 | 11/2012 | Ferris | |
| 2013/0073902 A1* | 3/2013 | Davis | G06F 17/30123 714/15 |
| 2013/0124920 A1 | 5/2013 | Adir et al. | |
| 2013/0198029 A1* | 8/2013 | Mowatt | G06Q 30/02 705/26.7 |
| 2013/0226320 A1 | 8/2013 | Berg-Sonne et al. | |
| 2013/0282752 A1* | 10/2013 | Day-Richter | G06F 21/62 707/769 |
| 2013/0282755 A1 | 10/2013 | Procopio et al. | |
| 2014/0149477 A1 | 5/2014 | Abramovitz et al. | |

OTHER PUBLICATIONS

Nomiyama, H., "Method of Showing Word Equivalents in a readable Format in Machine Translation", IP.com, Aug. 1, 1990, pp. 178-182.

IBM, "A Technique for Storing Electronic in Long-term", IP.com, Dec. 26, 2007, pp. 1-2.

United States Official Action dated Nov. 4, 2014 received in related application U.S. Appl. No. 13/966,874.

U.S. Final Office Action dated May 21, 2015 issued in U.S. Appl. No. 13/966,874.

U.S. Office Action dated Jan. 5, 2016 issued in U.S. Appl. No. 13/966,874.

* cited by examiner

FILES TYPES READABILITY IN WHOLE ENTITY

| FILE TYPE | APPLICATION(S) | PERCENTAGE INSTALLED IN PER APPL. | PER FILE TYPE | ZONE | NO. OF DOCS |
|---|---|---|---|---|---|
| .sam | LOTUS AmiPro | 0,5% | 0,5% | | X 5.784 |
| .123 | LOTUS 1-2-3 | 1,0% | 1,0% | | X 18.365 |
| .odp | LOTUS SYMPHONY | 87,3% | 87,9% | | Y 98.348 |
| | APACHE OPEN OFFICE | 1,2% | | | |
| .ppt | MS POWERPOINT | 98,7% | 98,7% | | Y 264.398 |
| .bqy | BRIO | 46,0% | 46,0% | | Z 15.297 |
| .hvv | UNKNOWN | UNKNOWN | UNKNOWN | | X 157 |

FIG. 17

FILES TYPES READABILITY IN WHOLE ENTITY

| FILE TYPE | APPLICATION(S) | PERCENTAGE INSTALLED IN ENTITY | | ZONE | NO. OF DOCS APPROXIMATELY REMAIN UNTIL... | | | | |
|---|---|---|---|---|---|---|---|---|---|
| | | PER APPL. | PER FILE TYPE | | TOTAL PER TODAY | 2015 | 2020 | 2025 | BEYOND 2025 |
| .sam | LOTUS AmiPro | 0,5% | 0,5% | X | 5.784 | 4.576 | 2.574 | 1.578 | 384 |
| .123 | LOTUS 1-2-3 | 1,0% | 1,0% | X | 18.365 | 16.486 | 9.453 | 4.513 | 1.264 |
| .odp | LOTUS SYMPHONY | 87,3% | 87,9% | Y | 98.348 | 97.156 | 95.156 | 46.186 | 42.541 |
| | APACHE OPEN OFFICE | 1,2% | | | | | | | |
| .ppt | MS POWERPOINT | 98,7% | 98,7% | Y | 152.546 | 120.321 | 87.213 | 56.154 | 15.642 |
| .bqy | BRIO | 46,0% | 46,0% | Z | 15.297 | 12.545 | 9.453 | 1.562 | 954 |
| .hw | UNKNOWN | UNKNOWN | UNKNOWN | X | 157 | 142 | 21 | 3 | -- |

FIG. 18

FILES TYPES READABILITY IN DRILLED DOWN BY REPOSITORY

| FILE TYPE | CONTENT MGMT. REPOSITORY | APPLICATION(S) | INSTALLATION PERCENTAGE | | ZONE |
|---|---|---|---|---|---|
| | | | PER APPL. | PER FILE TYPE | |
| .sam | A | LOTUS AmiPro | 0.7% | 0.7% | X |
| | C | | 0.1% | 0.1% | X |
| .123 | A | LOTUS 1-2-3 | 1.0% | 1.0% | X |
| | B | | 0.1% | 0.1% | X |
| | C | | 8.0% | 8.0% | X |
| .odp | A | LOTUS SYMPHONY | 87.3% | 87.3% | Y |
| | B | LOTUS SYMPHONY | 91.4% | 91.4% | Y |
| | | APACHE OPEN OFFICE | 0.2% | | |
| | C | LOTUS SYMPHONY | 1.2% | 4.1% | Y |
| | | APACHE OPEN OFFICE | 4.0% | | |
| .ppt | A | MS POWERPOINT | 98.7% | 98.7% | Y |
| | B | | 91.2% | 91.2% | Y |
| | C | | 97.8% | 97.8% | Y |
| .bqy | A | BRIO | 27.1% | 27.1% | Z |
| | C | | 63.0% | 63.0% | Y |
| .hvv | B | UNKNOWN | UNKNOWN | UNKNOWN | X |

FIG. 20

FILES TYPES READABILITY IN DRILLED DOWN BY REPOSITORY

| CONTENT MGMT. REPOSITORY | FILE TYPE | APPLICATION(S) | INSTALLATION PERCENTAGE | | ZONE |
|---|---|---|---|---|---|
| | | | PER APPL. | PER FILE TYPE | |
| A | .sam | LOTUS AmiPro | 0,7% | 0,7% | X |
| | .123 | LOTUS 1-2-3 | 1,0% | 1,0% | X |
| | .odp | LOTUS SYMPHONY | 87,3% | 87,3% | Y |
| | .ppt | MS POWERPOINT | 98,7% | 98,7% | Y |
| | .bqy | BRIO | 27,1% | 27,1% | Z |
| B | .123 | LOTUS 1-2-3 | 0,1% | 0,1% | X |
| | .odp | LOTUS SYMPHONY | 91,4% | 91,4% | Y |
| | .ppt | APACHE OPEN OFFICE | 0,2% | 91,2% | Y |
| | | MS POWERPOINT | 91,2% | | Y |
| | .hvv | UNKNOWN | UNKNOWN | UNKNOWN | X |
| C | .sam | LOTUS AmiPro | 0,1% | 0,1% | X |
| | .123 | LOTUS 1-2-3 | 8,0% | 8,0% | X |
| | .odp | LOTUS SYMPHONY | 1,2% | 4,1% | X |
| | | APACHE OPEN OFFICE | 4,0% | | |
| | .ppt | MS POWERPOINT | 97,8% | 97,8% | Y |
| | .bqy | BRIO | 63,0% | 63,0% | Y |

FIG. 21

| CONTENT MGMT. REPOSITORY | FILES TYPES READABILITY IN DRILLED DOWN BY REPOSITORY AND USER GROUPS ||||||||
|---|---|---|---|---|---|---|---|---|
| | USER GROUP | NO. OF USERS | FILE TYPE | APPLICATION(S) | INSTALLATION PERCENTAGE |||
| | | | | | PER APPL. | PER FILE TYPE | ZONE | NO. OF APPLICABLE DOCS |
| A | ACCOUNTING_READER | 758 | .sam | LOTUS AmiPro | 0.7% | 0.7% | | X 25 |
| | | | .123 | LOTUS 1-2-3 | 1.0% | 1.0% | | X 654 |
| | | | .odp | LOTUS SYMPHONY | 87.3% | 88.2% | | Y 7.568 |
| | | | | APACHE OPEN OFFICE | 5.0% | | | |
| | | | .ppt | MS POWERPOINT | 98.7% | 98.7% | | Y 2.977 |
| | | | .bqy | BRIO | 27.1% | 27.1% | | Z 1.264 |
| | FINANCE_ANALYST | 254 | .sam | LOTUS AmiPro | 8.3% | 8.3% | | X 2.456 |
| | | | .123 | LOTUS 1-2-3 | 5.2% | 5.2% | | X 3.456 |
| | | | .odp | LOTUS SYMPHONY | 97.8% | 99.2% | | Y 9.416 |
| | | | | APACHE OPEN OFFICE | 51.2% | | | |
| | | | .ppt | MS POWERPOINT | 72.7% | 72.7% | | Y 1.302 |
| | | | .bqy | BRIO | 62.1% | 62.1% | | Y 8.456 |
| | AR_MANAGER | 138 | .sam | LOTUS AmiPro | 0.1% | 0.1% | | X 745 |
| | | | .123 | LOTUS 1-2-3 | 8.0% | 0.8% | | X 27 |
| | | | .odp | LOTUS SYMPHONY | 78.5% | 79.8% | | Y 6.845 |
| | | | | APACHE OPEN OFFICE | 2.3% | | | |
| | | | .ppt | MS POWERPOINT | 78.2% | 78.2% | | Y 2.655 |
| | | | .bqy | BRIO | 21.8% | 21.8% | | Z 565 |
| | PRICE_APPROVER | 97 | .sam | LOTUS AmiPro | 0.2% | 0.2% | | X 97 |
| | | | .123 | LOTUS 1-2-3 | 0.1% | 0.1% | | X 1.546 |
| | | | .odp | LOTUS SYMPHONY | 63.0% | 72.8% | | Y 6.874 |
| | | | | APACHE OPEN OFFICE | 11.2% | | | |
| | | | .ppt | MS POWERPOINT | 86.4% | 86.4% | | Y 8.756 |
| | | | .bqy | BRIO | 2.3% | 2.3% | | X 63 |
| | ETC. | | | | | | | |
| ETC. | | | | | | | | |

FIG. 22

Readability Support Matrix

You requested readability help on file type ".bqy". You can select to send an email to one of the following user groups for helping you to read your file. Please make the most appropriate selection. For data privacy reasons you'll not be shown the names. Instead the receiving colleagues will get your name together with your request to support you reading a file of type ".bqy".

| | BT/IT (your organization) | | FIN | | Research | |
|---|---|---|---|---|---|---|
| Price_Approver (your role) | ● Herrenberg<br>○ Ehningen (8km away)<br>○ Böblingen (18km away)<br>more... | 7<br>23<br>0 | ○ Herrenberg<br>○ Ehningen (8km away)<br>○ Böblingen (18km away)<br>more... | 18<br>22<br><5 | ○ Herrenberg<br>○ Ehningen (8km away)<br>○ Böblingen (18km away)<br>more... | 0<br>0<br><5 |
| AR_Manager | ○ Herrenberg<br>○ Ehningen (8km away)<br>○ Böblingen (18km away)<br>more... | <5<br>8<br>0 | ○ Herrenberg<br>○ Ehningen (8km away)<br>○ Böblingen (18km away)<br>more... | <5<br><5<br>0 | ○ Herrenberg<br>○ Ehningen (8km away)<br>○ Böblingen (18km away)<br>more... | 0<br>0<br><5 |
| Finance_Analyst | ○ Herrenberg<br>○ Ehningen (8km away)<br>○ Böblingen (18km away)<br>more... | 11<br>53<br><5 | ○ Herrenberg<br>○ Ehningen (8km away)<br>○ Böblingen (18km away)<br>more... | 36<br>41<br>6 | ○ Herrenberg<br>○ Ehningen (8km away)<br>○ Böblingen (18km away)<br>more... | 0<br>0<br><5 |
| Accounting_Reader | ○ Herrenberg<br>○ Ehningen (8km away)<br>○ Böblingen (18km away)<br>more... | 0<br>48<br><5 | ○ Herrenberg<br>○ Ehningen (8km away)<br>○ Böblingen (18km away)<br>more... | 7<br>23<br>0 | ○ Herrenberg<br>○ Ehningen (8km away)<br>○ Böblingen (18km away)<br>more... | 0<br>0<br><5 | more...

[ Send Email ] [ Help ] [ Cancel ]

ENSURING ACCESS TO LONG-TERM STORED ELECTRONIC DOCUMENTS

BACKGROUND

Once the first content management systems were implemented (e.g., IBM CONTENT MANAGER) important documents typically got scanned and stored in a file format as a bit-mapped graphic. To this day, a relatively few file types (e.g., tiff, .jpg, .bmp) are used to store documents. These few file types are typically still readable (e.g., by a computer or other device). However, within the last decade more and more documents began to get stored directly in their native formats (e.g. 0.123, .sam, .xls, .opd, pdf, doc, docx, etc.). In the future, the range of different file formats in long-term storage will likely dramatically increase.

FIGS. 1 and 2 depict diagrams showing an example relationship related to conventional document support.

More particularly, as seen in FIG. 1, guidelines 101 typically delegated responsibility to user 103 (however, user 103 typically assumed that the guidelines 101 would provide for the solution 105 (the solution being the solution of how to access documents)). Further, guidelines 101 typically assumed that the solution 105 existed (however, the solution 105 may have only existed in the past). In addition, user 101 typically assumed that the solution 105 existed (however, the solution 105 may have only existed in the past). Thus, as seen in FIG. 2, when the solution no longer exists, the assumptions break down.

In addition, once a document is created it is typically only associated with a compatible program via a document extension (e.g. .doc for Microsoft Word, .odf for Open Document Format).

SUMMARY

In one example, the present disclosure relates generally to the field of ensuring access to long-term stored electronic documents (in various specific examples, the access may be read access, write access and/or create access).

In one embodiment, a computer readable storage medium, tangibly embodying a program of instructions executable by the computer for ensuring access to long-term stored electronic documents is provided, the program of instructions, when executing, performing the following steps: tracking, for each of a plurality of file types, a count of a number of installed software programs that are capable of accessing each of the file types; storing data indicative of the tracked number of installed software programs; determining when a user attempts to uninstall one of the tracked installed software programs; and informing the user, based at least in part upon the stored data and the determination of the attempt to uninstall, of at least one consequence of the attempted uninstall.

In another embodiment, a computer-implemented system for ensuring access to long-term stored electronic documents is provided, the system comprising: a tracking element configured to track, for each of a plurality of file types, a count of a number of installed software programs that are capable of accessing each of the file types; a storing element configured to store data indicative of the tracked number of installed software programs; a determining element configured to determine when a user attempts to uninstall one of the tracked installed software programs; and an informing element configured to inform the user, based at least in part upon the stored data and the determination of the attempt to uninstall, of at least one consequence of the attempted uninstall.

BRIEF DESCRIPTION OF THE DRAWINGS

Various objects, features and advantages of the present invention will become apparent to one skilled in the art, in view of the following detailed description taken in combination with the attached drawings, in which:

FIGS. 17-22 depict various cockpit dashboard-type examples related to readability of file types according to an embodiment (of note, in a concrete implementation the various zones may be delineated by colors rather than the shading shown in these Figs.).

FIGS. 27-29 depict a number of example screenshots for a Readability Support Matrix according to an embodiment.

DETAILED DESCRIPTION

In one example, one or more systems may provide for automatically ensuring access to long-term stored electronic documents. In another example, one or more methods may provide for automatically ensuring access to long-term stored electronic documents. In another example, one or more algorithms may provide for automatically ensuring access to long-term stored electronic documents.

As described herein are mechanisms to ensure that documents within an entity can be read as long as the documents persist. Conventional techniques address "what" and "how long" documents need to be stored. Various disclosed embodiments assume that users will store documents in whatever is currently "state of the art" and thus these embodiments create links between the document and the program used to create/modify/read the document. Once the link is created various disclosed techniques are used to monitor when linked programs are uninstalled from various computing devices so that notifications can be sent out and/or direct action taken (e.g., when the number of programs dwindles to the point that readability of the linked documents comes in jeopardy).

Figure 1:
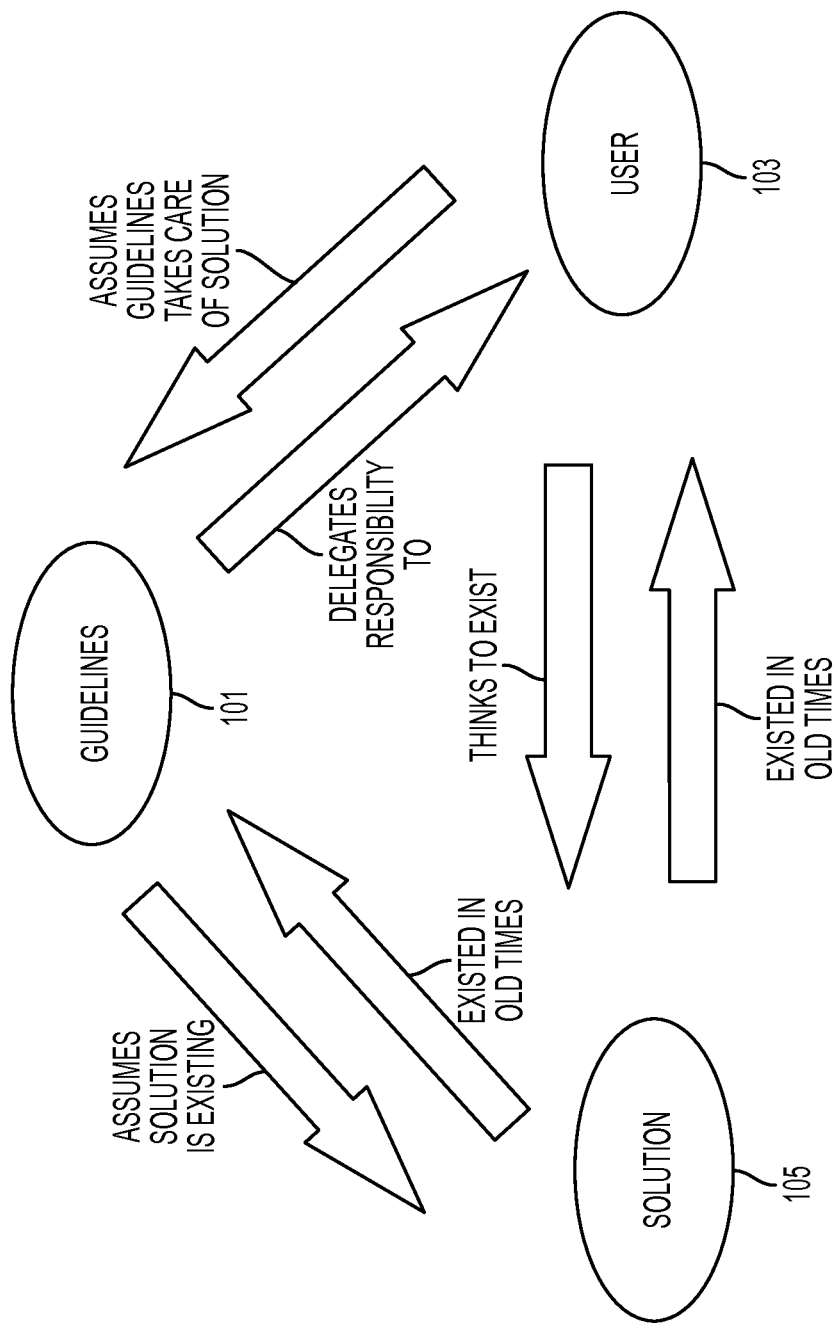
FIGS. 1 and 2 depict diagrams showing an example relationship related to conventional document support.
Figure 2:
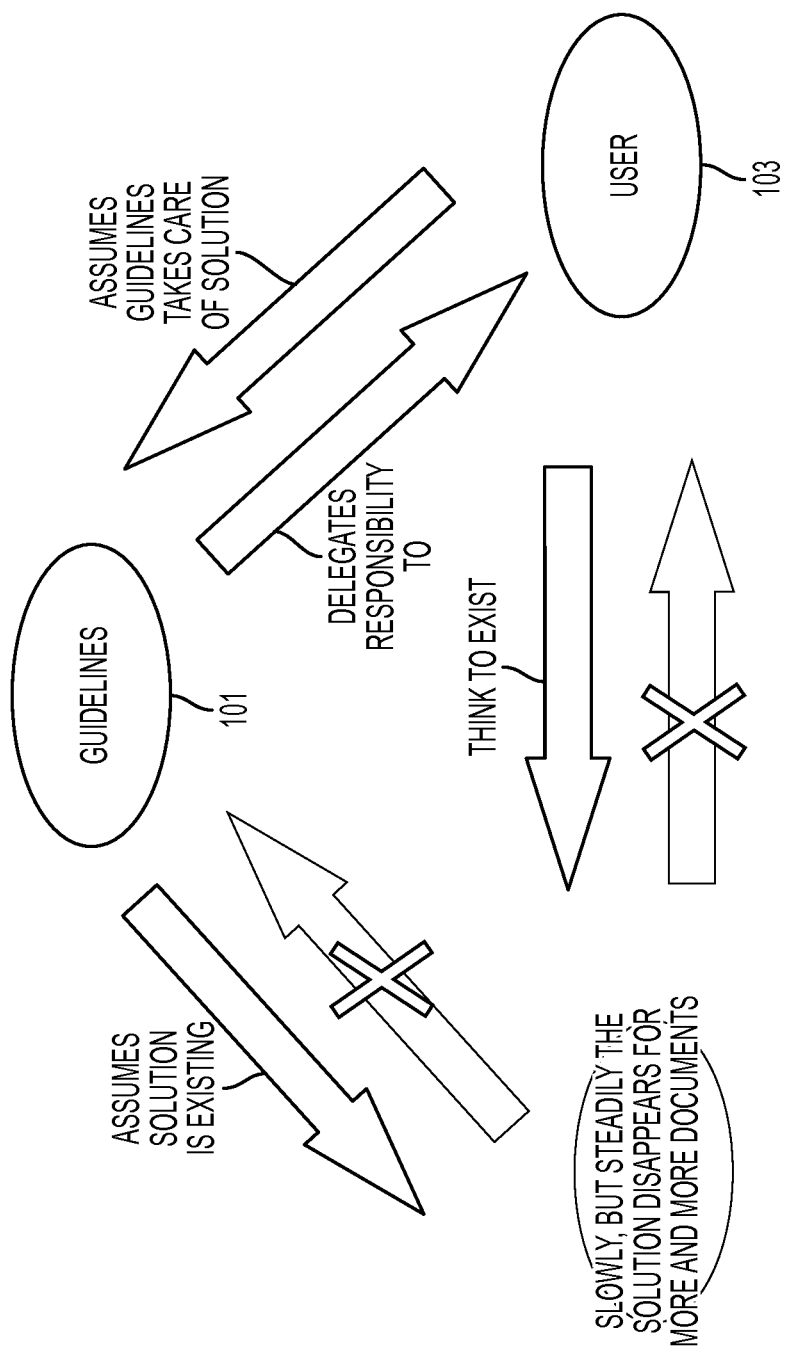
Figure 3:
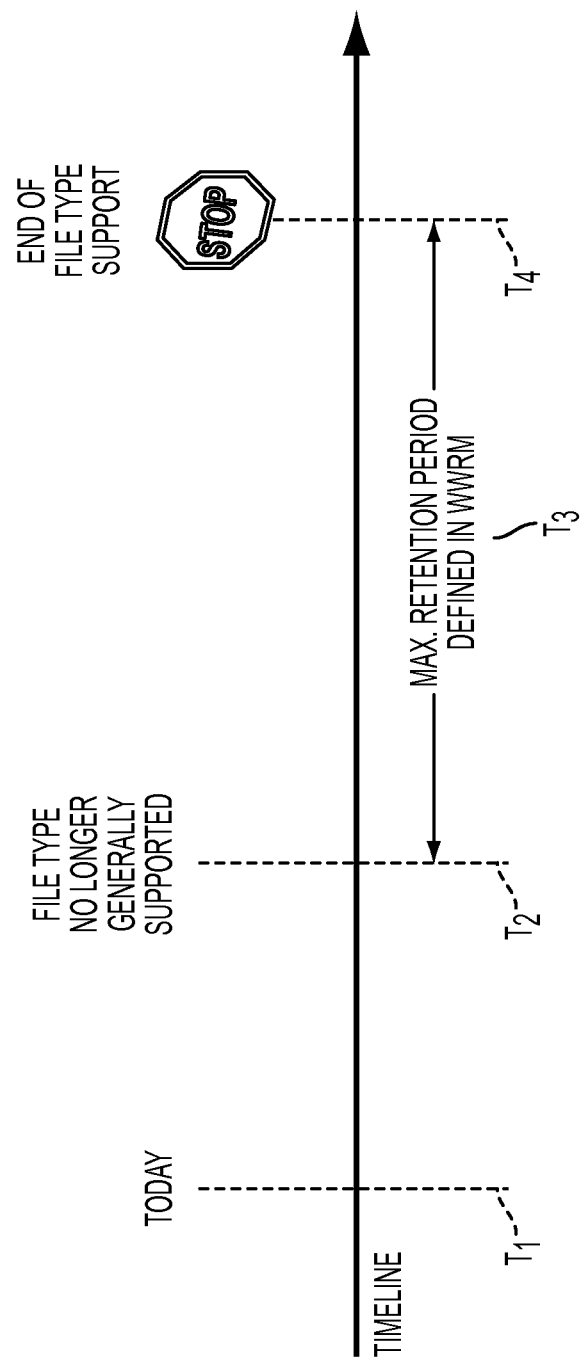
FIG. 3 is an example timeline diagram showing operation according to an embodiment.

Referring now to FIG. 3, an example operation according to one embodiment is shown.

More particularly, at a current time (Today at time $T_1$) a list of accepted file formats within an entity (e.g., a corporate organization) is defined (e.g., in IBM within a worldwide record management (WWRM) guideline). All systems which are storing documents for long-term storage will only be allowed to store documents of these accepted file formats.

Further, at an end of general file type support for a particular file type (see $T_2$)—that is, once a file type reaches itsend of support—then all systems which are storing long-term applicable documents enforce a restriction that no new files of this file type can be uploaded anymore.

Figure 5:
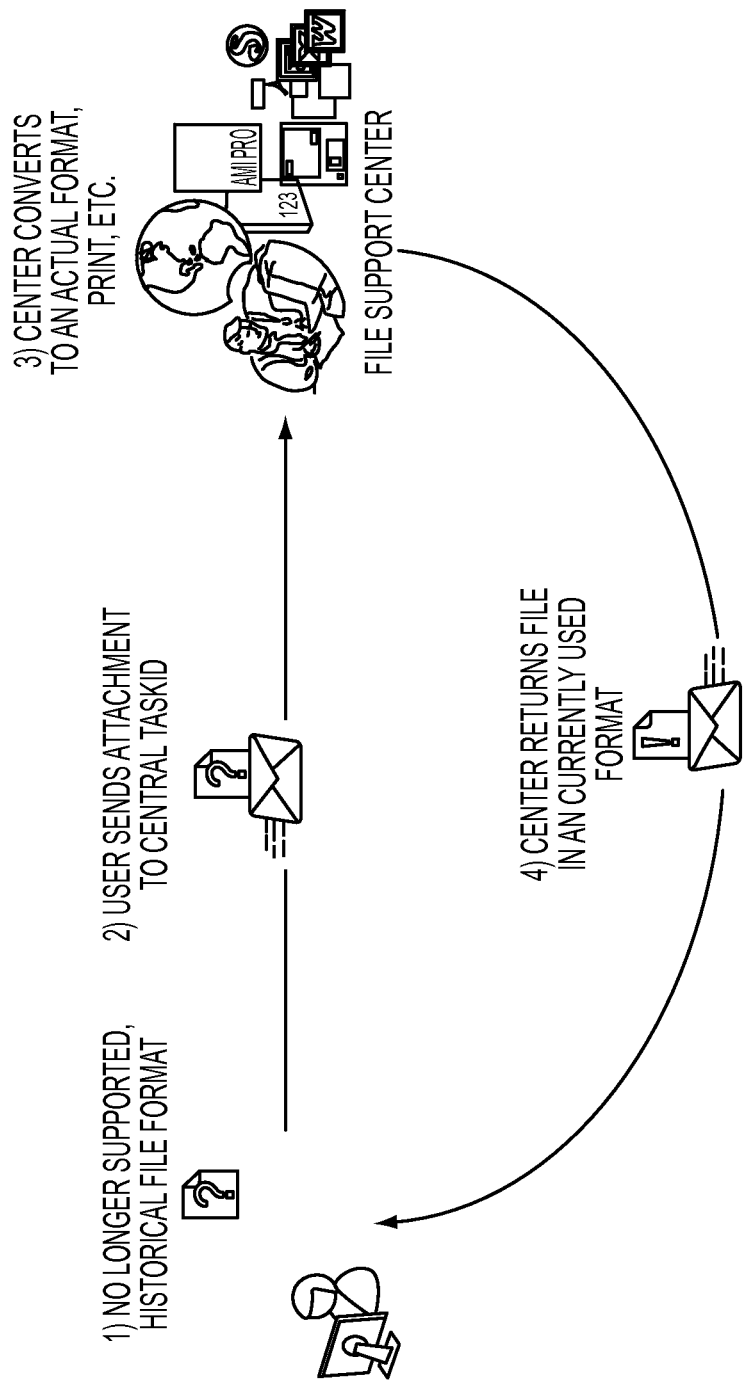
FIG. 5 depicts a diagram showing an operation according to an embodiment.

Further still, after end of general support ($T_2$) and prior to the end of retention time ($T_3$): During the initial period after general support ended some users still may be able to open the file type themselves. With time that will become more and more unlikely. If a user can not open a file, the user sends the file to a dedicated taskid/center (see FIG. 5). This taskid/center: (a) has the infrastructure available (e.g., old programs, knowledge, licenses, etc.); and (b) returns content in an appropriate, supported format (e.g. a printout, converted to a newer format, converted as an supported image format, etc.).

Finally, referring again to FIG. 3, at the end of a specific file type support ($T_4$): Once the maximal desired retention period has been reached (for example, within IBM this can be calculated with WWRM and triggering factors known in WWRM-applicable systems) the support of this file type can finally end. That might be, for example, decades after the general support of that file type ended. In one specific example, keeping at least a single dedicated taskid/center of FIG. 5 (or possibly multiples for backup reasons) will enable large entities to access all desired documents and also to keep required infrastructure costs to a minimum.

Figure 4:
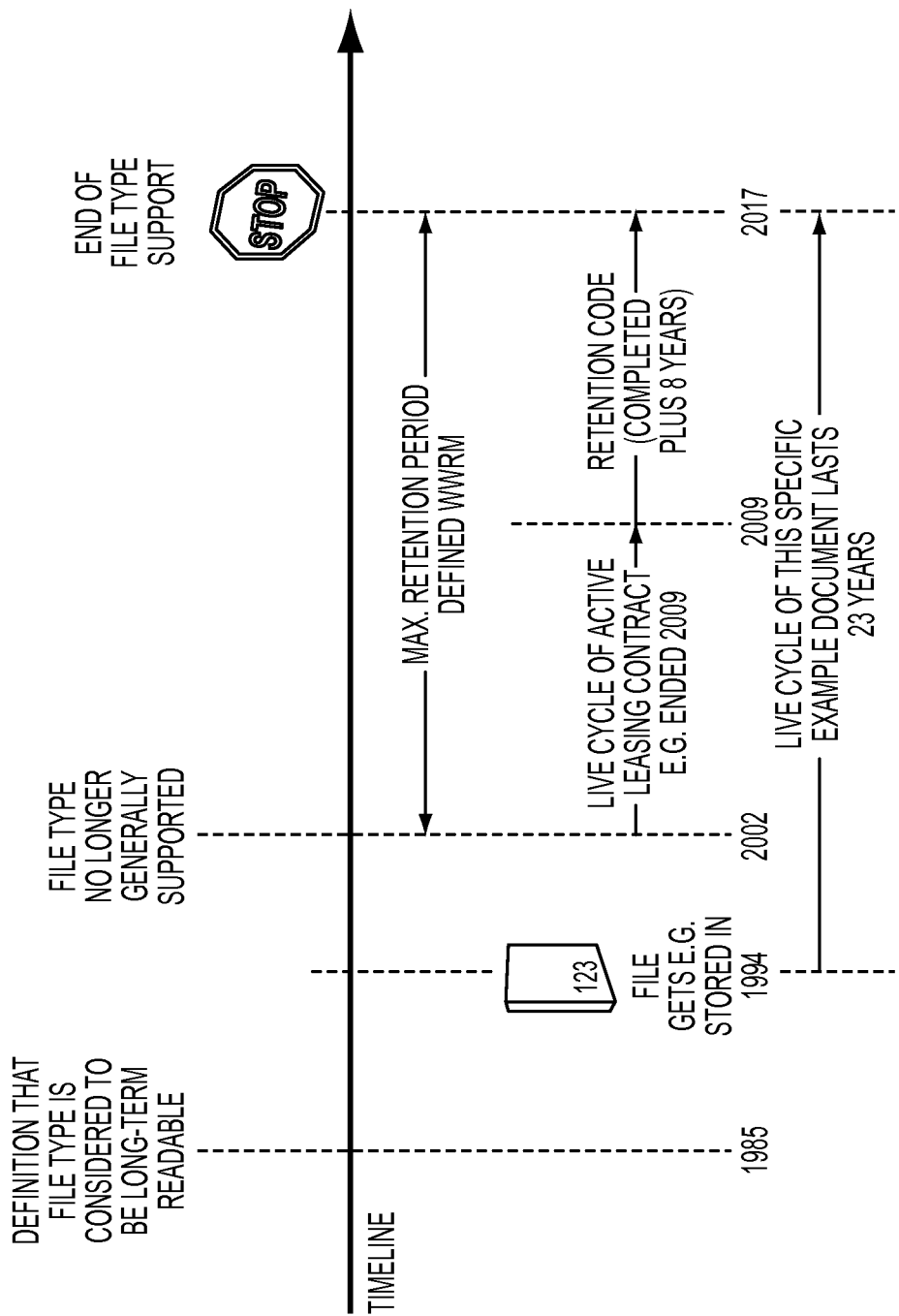
FIG. 4 is an example timeline diagram showing a potential long term benefit according to an embodiment.

Referring now to FIG. 4, an example timeline diagram of a potential long term benefit according to an embodiment is shown. More particularly, this example, assumes implementation of various mechanisms back in 1985, as shown, for the file format LOTUS 123. This example further assumes an important, audit-relevant pricing calculation sheet would have been stored for a long-running leasing contract in 1994 (with general file type support ending in 2002). Further, as seen, the max retention period defined in WWRM includes the life cycle of the active leasing contract, and the 8 years added by the retention code. Thus, the life cycle of this specific example document lasts 23 years, Referring now to FIG. 6, a block diagram of a system according to an embodiment is shown. In this embodiment, it is recognized that electronic file types will come and go. Over the long term, nobody will be able to state beforehand which file types will be available in the future (what today seems obvious, can long-term be completely different).

Therefore, various mechanisms provide an entity with the ability to control access to (e.g., readability of) file types. The entity is provided the ability to make informed decisions. This includes being able (from a file type view) to make an informed risk assessment of outgoing file type support.

In other examples, various mechanisms enable the use of minimum required disk space. In other examples, double-format storage (that is, storage of a document as more than one file type) is able to be limited to a minimum. In other examples, use of embedded viewers is able to be limited to a minimum.

Still referring to FIG. 6, a discussion of a General Database Model according to one example will now be made. In this example: a unique identifier for each user (e.g. employee serial number) is required to be consistent across all databases; readability of applications must be able to be precise defined; user groups need to be consistently named (or at least consistently identified across all databases); updates from File Type Repository (FTR) 601 (which may comprise a database), Sample Population Database 603 and Workstation Asset Management (WAM) 605 (which may comprise a database) to the Readability Management Database 607 may happen rarely (e.g. weekly). Due to the long-term nature rare updates are acceptable.

In one specific example, updates from the above mentioned databases do not necessarily need to be synchronized with regard to run time. In another specific example, the subsequent monitoring may be run daily (e.g., due to different non-synchronized updates as well as to inform a user promptly as described herein when uninstalling programs).

Still referring to FIG. 6, a more detailed discussion of the File Type Repository (FTR) 601 will now be made. In this example: (i) the FTR 601 stores all file type information from all content management repositories (this includes: file type extension, number of documents per file type, association of file types per defined user groups in repositories (and only for record management enabled repositories: retention end per file type (for non-record management enabled repositories "forever" is assumed)); (ii) in a separate table FTR 601 needs to contain maintained data regarding which file types can be read by which applications (in one example, relationships should be one-directional (e.g., file type to application)—the reverse statement can be derived from the sum of these statements—for example (but not limited to): (a) File type .csv can be read by: LOTUS SYMPHONY, APACHE OPEN OFFICE, MS EXCEL, LOTUS 1-2-3; (b) File type .doc can be read by: MS WORD, LOTUS SYMPHONY; (iii) Reability of application can be "full" or "limited" (e.g., can other than original programs open certain file types, but only with limited ability to interpret all features correctly (e.g., LOTUS SYMPHONY can open with limited functionality LOTUS 1-2-3 files)); (iv) to reach high data quality all data version ranges (from/to) should be maintained (what is readable for what file types).

Still referring to FIG. 6, a more detailed discussion of the WAM—Workstation Asset Management 605 will now be made. In one example, theWAM is a tool that tracks hardware and software on a workstation and stores the tracked data in a repository. In another example, the WAM is a hardware/software database that an enterprise can use to identify what software is installed on a given workstation. In another example: the WAM pulls (determines) installed programs of the users (for certain countries, this may need to be a passive "pull" (e.g., only pulling with respect to a previously agreed application list)).

Still referring to FIG. 6, a more detailed discussion of the Sample Population Database 603 will now be made. In one example implementation: the Sample Population Database 603 is extracted for affected content management repositories (e.g., via one or more linkages) from automated access management tools used for these repositories. If no linkage to automated authorization management tools exists, then representative user groups needs may instead to be defined.

Figure 6:
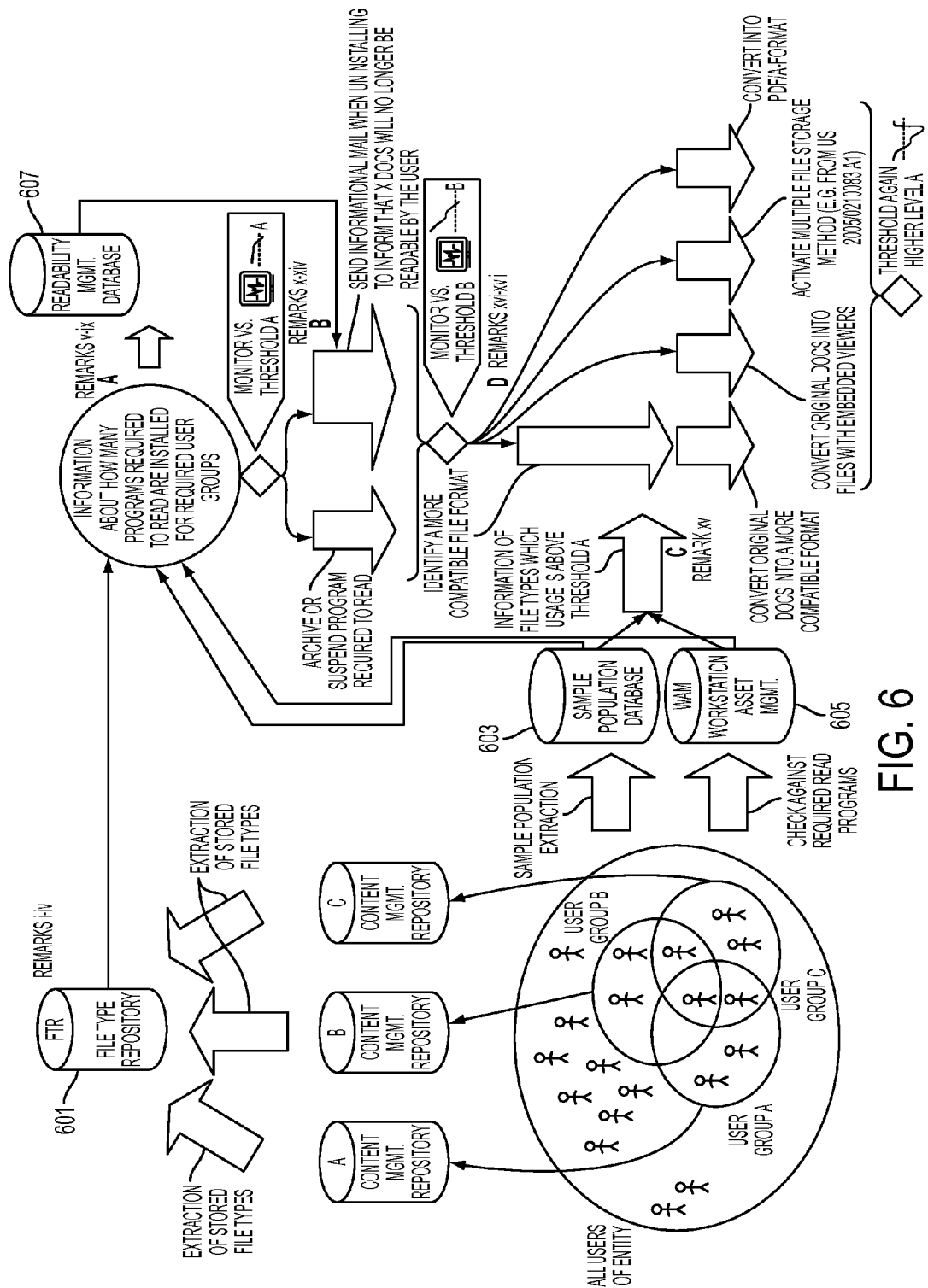
FIG. 6 depicts a block diagram of a system according to an embodiment.

Referring now to the processing depicted at Point A of FIG. 6 (with regard to information load for a GUI dashboard), the following, for example, is noted: (v) data from Workstation Asset Management (WAM), Sample Population Database and File Type Repository are loaded into the Readability Management Database; (vi) the file type to readable program table from the File Type Repository database may be loaded separately; (vii) the resulting Readability Management Database contains at least four tables, as shown in the high-level database model (see FIG. 7); (viii) incoming updates from File Type Repository (FTR), Sample Population Database and Workstation Assess Management (WAM) can run rarely such as, for example, weekly (the more frequent, the shorter the turnaround time for emails to users); (ix) subsequent monitoring regarding user information management may run daily—in one example, all data loads of information into an information repository do not have to be synchronized and run at the same time (that is, data loads may be run in different intervals).

Referring now to Point B of FIG. 6 (with regard to information to users), the following, for example, is noted: (x) basis for user identification is the Readability Management Database; (xi) user email address may be retrieved from an address book, where the unique user identifier (e.g. employee serial number) is a search criteria; (xii) when a user attempted to uninstall or does unistall a program required for readability automatically send an email to him stating the consequences (e.g., how many documents, belonging to which content management repository, he no longer will be able to read); (xiii) combined with readability information of file types the informational email should show the user also alternatives—full and limited ones—to keep readability (basis for this information will come from reverse statements out of separate table in the File Type Repository (FTR) about application readabilities); (xiv) once threshold A has been passed, then send information emails to users who still have the program installed. The email should emphasize the importance that they keep the program installed—further it should express what the consequences would be, when they would uninstall the program (e.g., "When you uninstall the application XYZ, you will be unable to read X documents of file type .abc (belonging to your user group DEF")).

Figure 12:
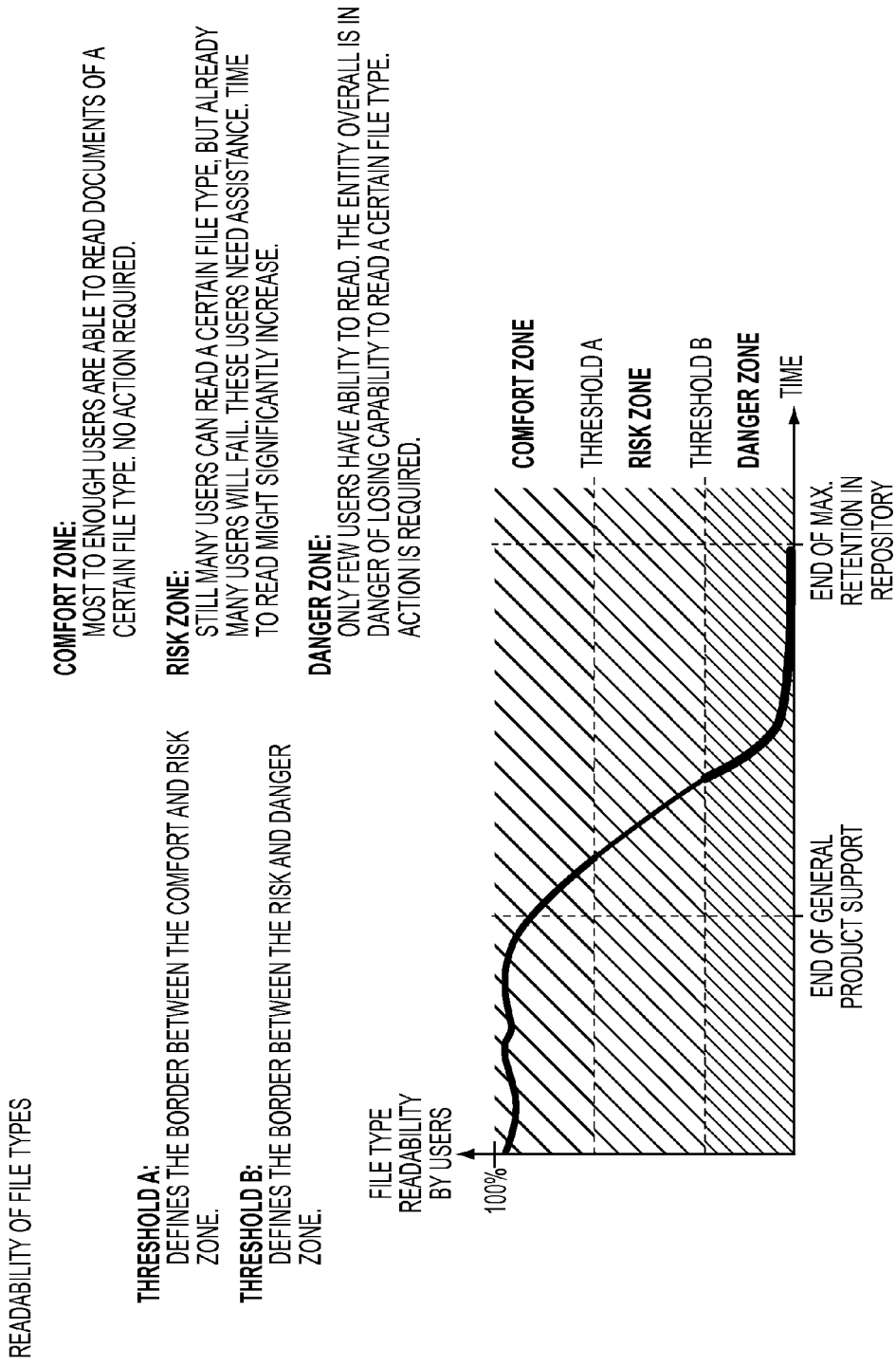
FIGS. 12-16 depict various graph examples related to readability of file types according to an embodiment (of note, in a concrete implementation the various zones may be delineated by colors rather than the shading show in these Figs.).
Figure 13:
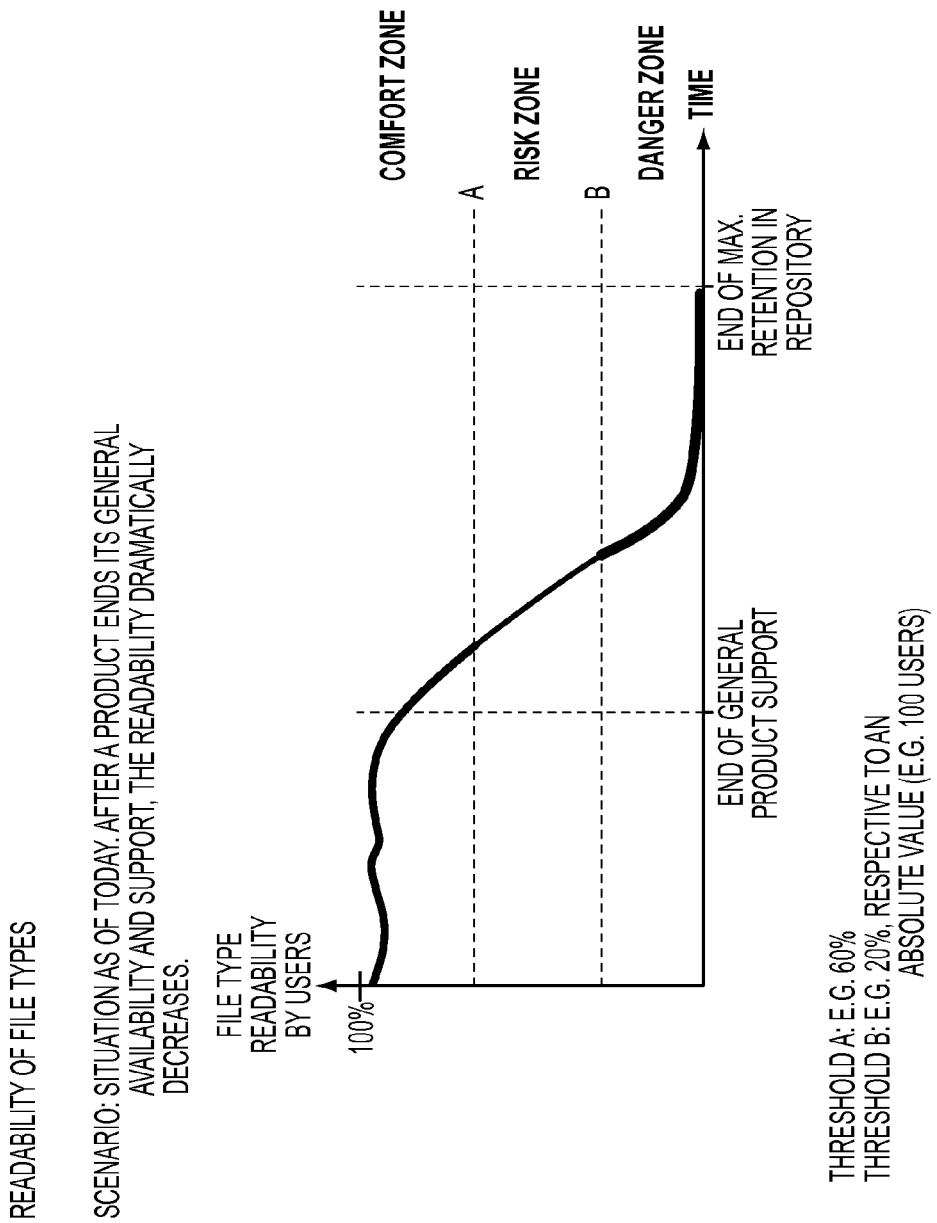
Figure 14:
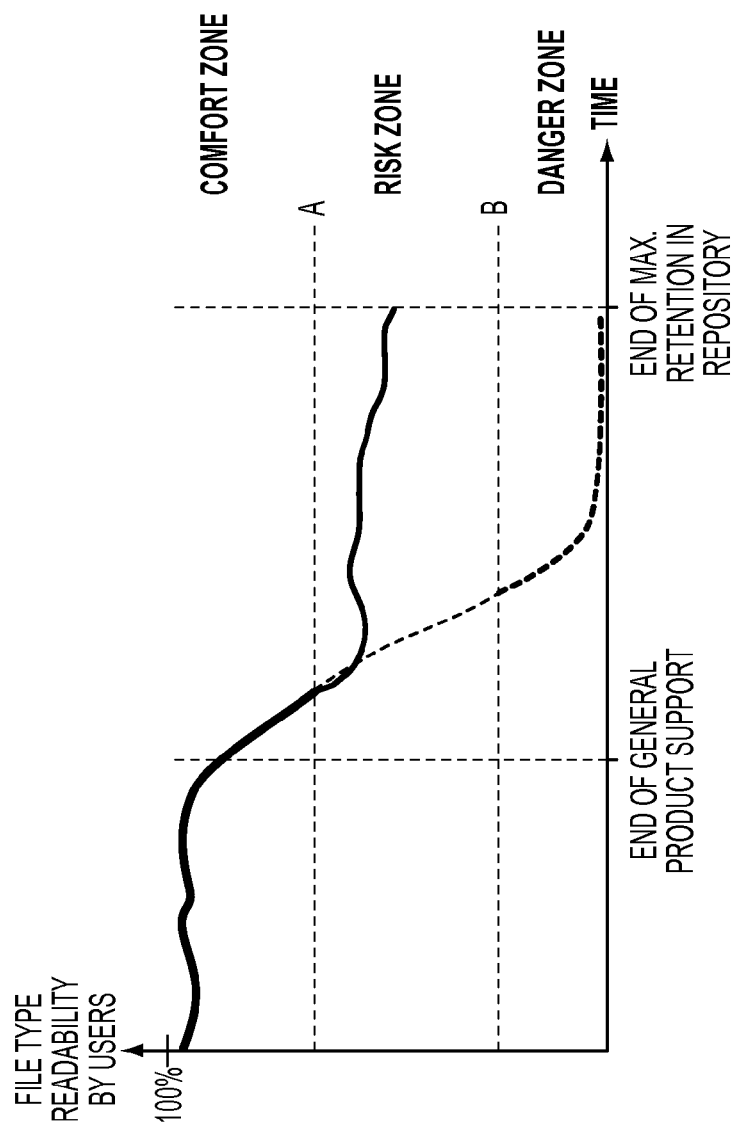
Figure 15:
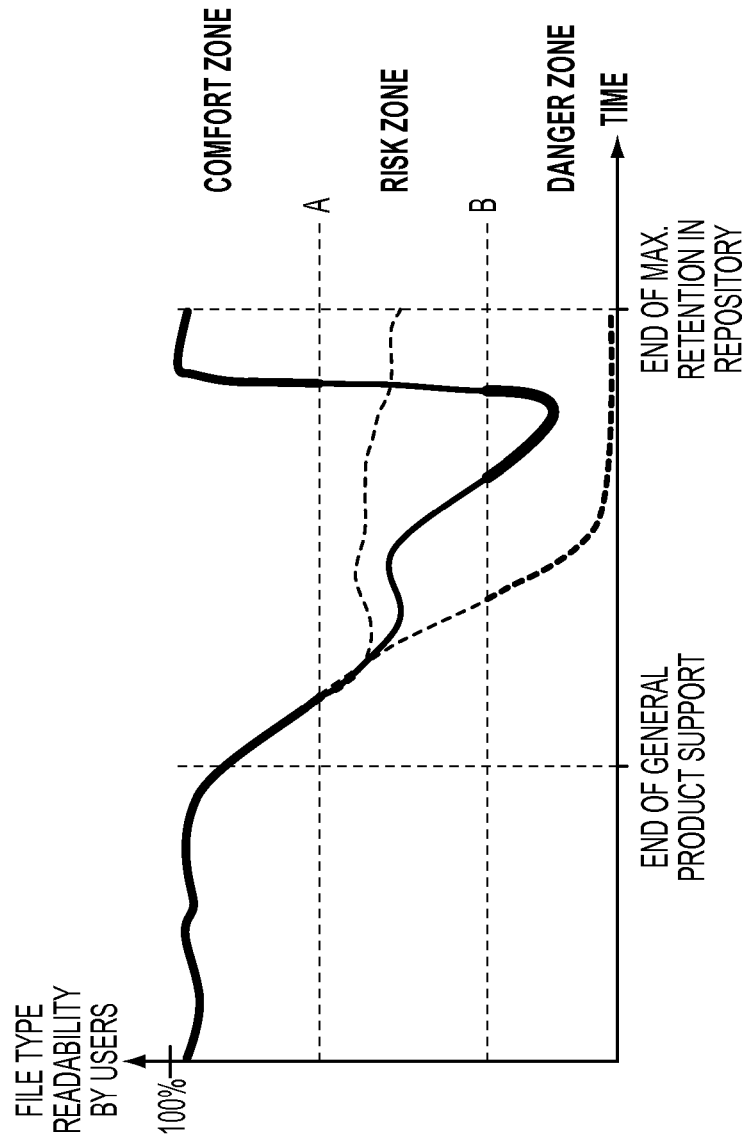
Figure 16:
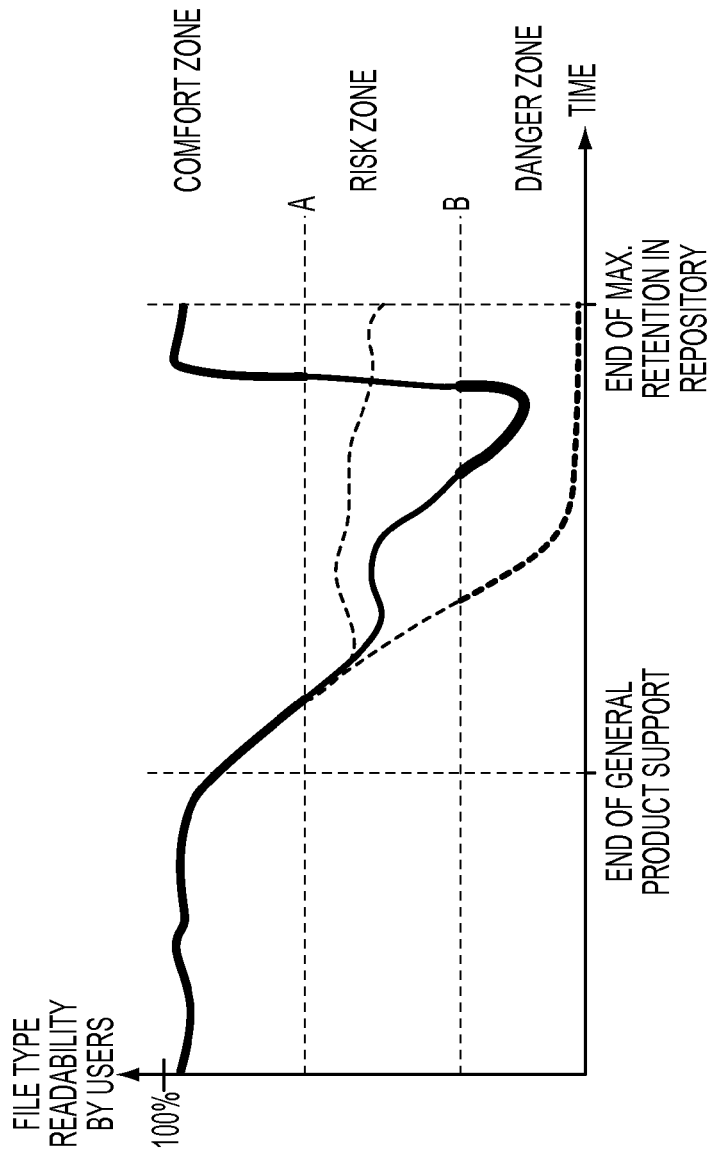

In one example, threshold A may be a user/administrator definable number and/or definable percentage of installed instances of the program that can read a given document (e.g., threshold A may be the value defining the border between comfort zone and risk zone as shown in FIG. 12). In one specific example, an enterprise may want to be notified when there are only 50 remaining instances or 70% of user readability of a given program remaining on workstations.

Referring now to Point C of FIG. 6 (with regard to data input for a new/current format), the following, for example, is noted: (xv) merge Sample Population Database and Workstation Asset Management (WAM) to generate information about what user groups have installed to what level what programs providing what readability. Readability of new/current format should be above threshold A.

In another example related to threshold A, there may be a desire to warn an enterprise (and/or users of a particular program) if only a few remaining instances of the program that can read a given file exits (there may also be a desire to ensure a given level of readability). In another example, if a new program comes out with backwards readability to read a given legacy file type, then that would increase the number of computers that can read that file type (possibly taking it above the threshold).

In another example, threshold A may be programmed as follows: a standard query run against the database storing the data. In one specific example: Count the number of installed instances of application XYZ; Compare that number respective identified percentage to the predefined threshold; If the number is above the threshold, do nothing. If the number is below the threshold, take the actions defined.

Referring now to Point D of FIG. 6 (with regard to method selection below threshold B), the following, for example, is noted: (xvi) final selection of method when passing threshold B should be done by a retention administrator. Different aspects may significantly influence the final decision: (i) available alternative applications; (ii) number of remaining documents associated with expiration dates; (iii) storage size; and (xvii) the factors table may help the retention administrator to choose the appropriate action (see FIG. 10).

In one example, threshold B may be implemented similar to threshold A. In one specific example, threshold B may be determined by a user/administrator definable number of devices and/or definable percentage of instances that can read a file type (e.g., threshold B may define the border between risk zone and danger zone as shown in FIG. 12). In one specific example, once that value is reached, take specific actions, much like discussed above in connection with threshold A.

In another example, threshold B may be programmed as follows: a standard query run against the database storing the data. In one specific example: Count the number of installed instances of application XYZ; Compare that number to the predefined threshold. If the number is above the threshold, do nothing. If the number is below the threshold, take the actions defined.

In one example, readability must be ensured on an entity level. Although active bidirectional links between users and files would be possible to establish, users might change, therefor association on the actual user groups may be required.

Figure 7:
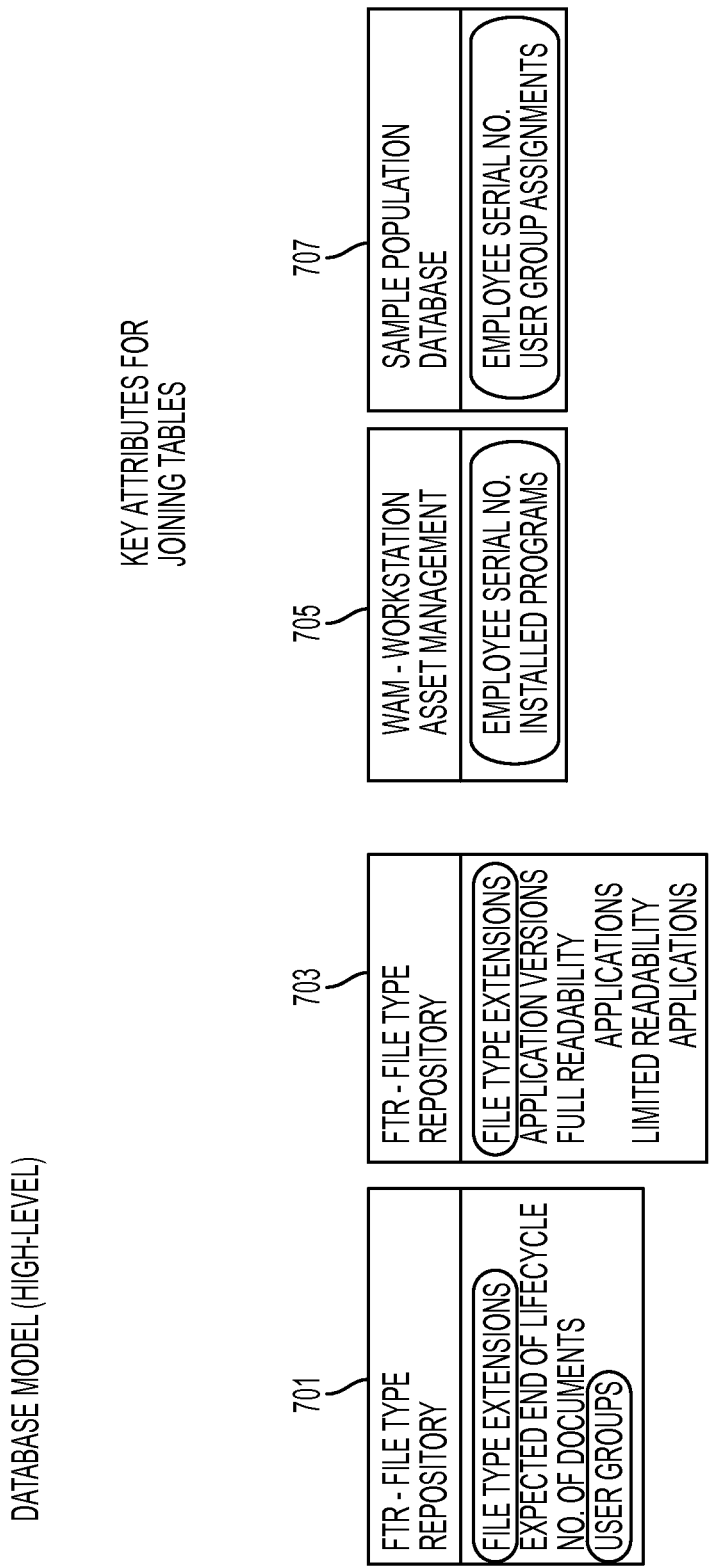
FIGS. 7-9 depict various high-level database model examples according to an embodiment.
Figure 8:
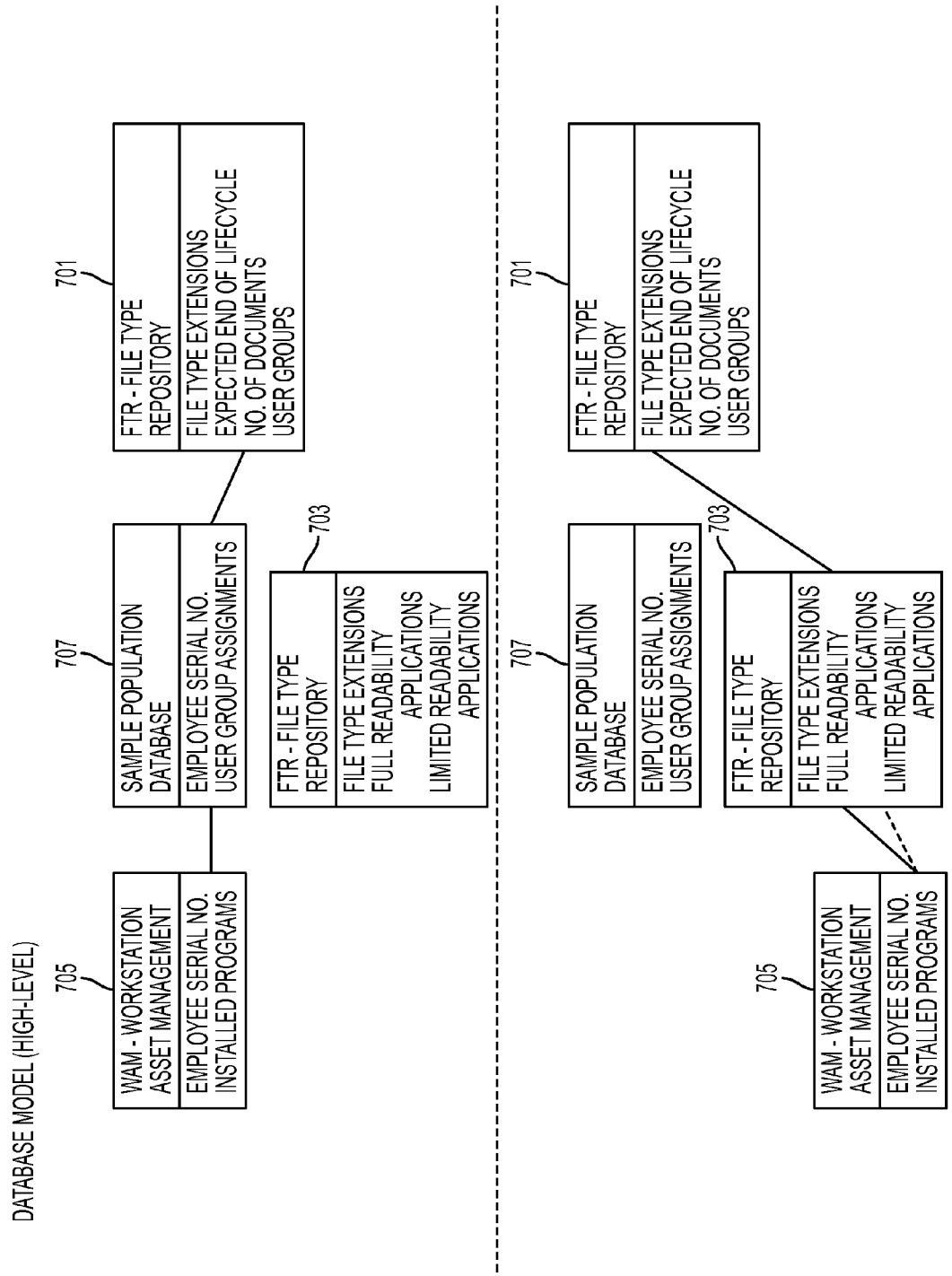
Figure 9:
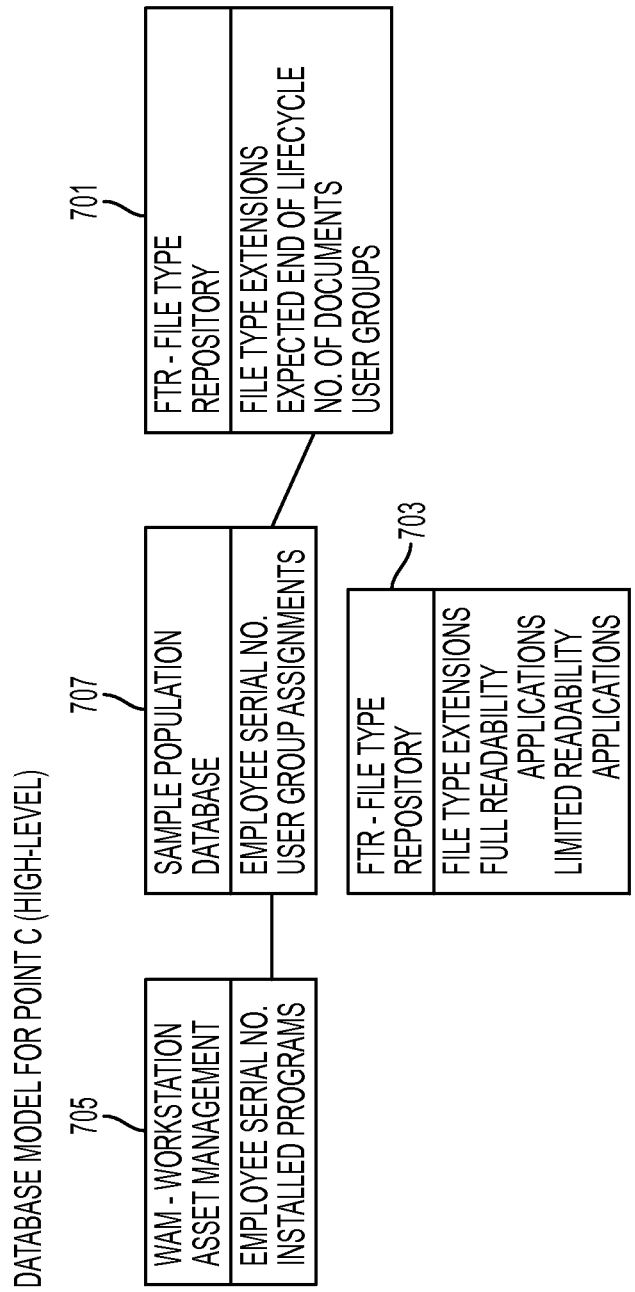

Referring now to FIGS. 7-9 various high-level database models according to an embodiment are shown. More particularly, FIG. 7 shows File Type Repository (FTR) table 701, File Type Repository (FTR) table 703; Workstation Access Management (WAM) table 705; and Sample Population Database table 707. Key attributes for joining tables are shown circled. These joining of tables are also shown in FIG. 8. Finally, FIG. 9 shows an example database model for "Point C" of FIG. 6.

Figure 10:
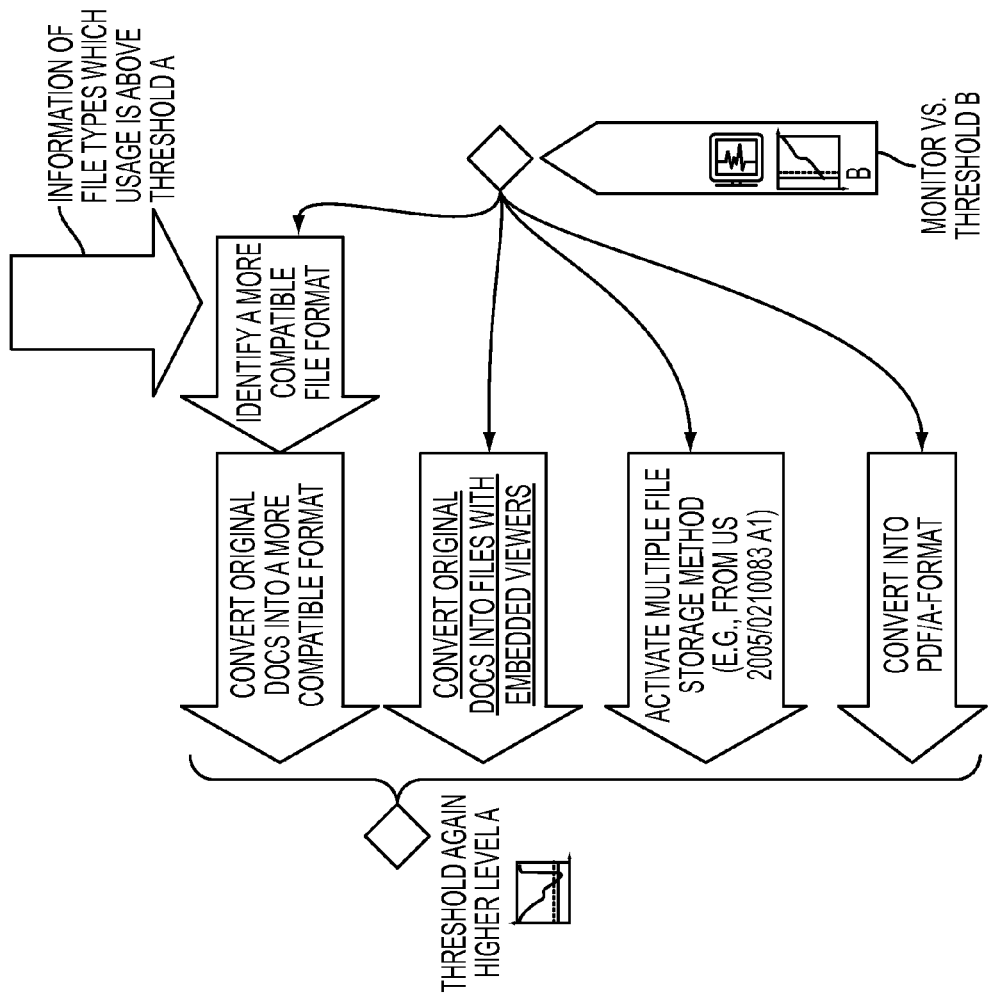
FIG. 10 depicts various factors for threshold B activities of FIG. 6 according to an embodiment.

Referring now to FIG. 10, various factors related to threshold B activities of FIG. 6 according to an embodiment are shown.

Figure 11:
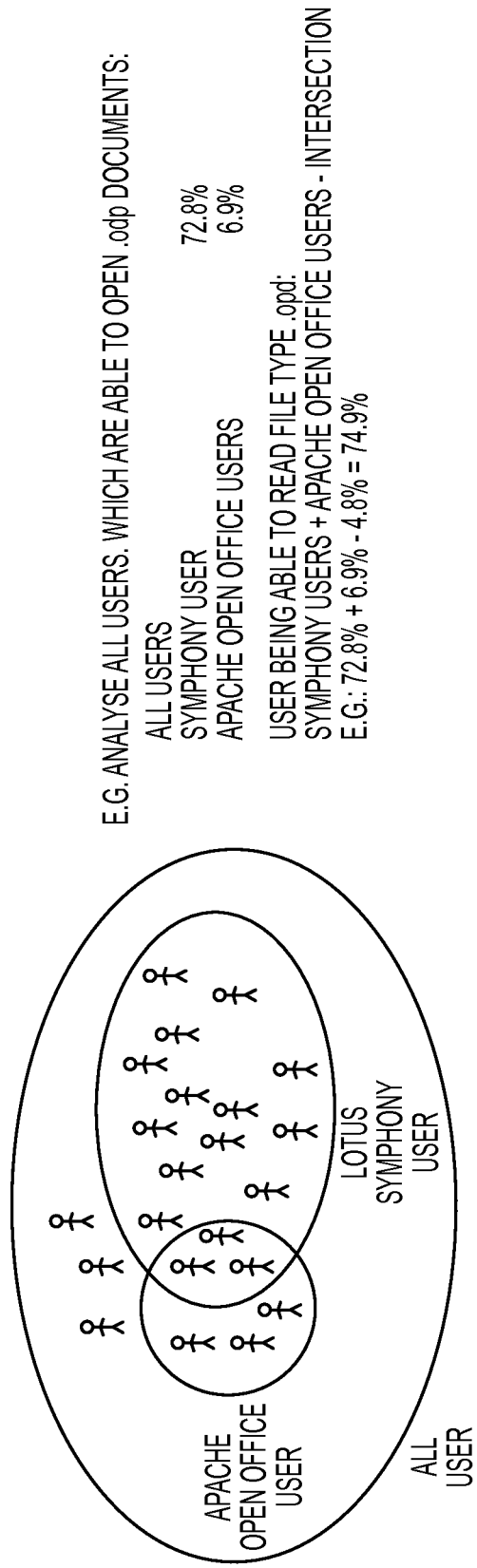
FIG. 11 depicts a diagram of a sample population dataset according to an embodiment.

Referring now to FIG. 11, a diagram of a sample population dataset according to an embodiment is shown. In one example, the dataset can be defined based on different granularities (e.g., either all the users of a repository as a whole or down to individual user groups).

As described herein, in order to evaluate how readable a particular document is the concept of a "readability index" is introduced. In various examples, this index measures how many linked programs exist for a given population of documents which need that program in order to be read. In one example, as described herein, the readability index of files should ideally remain in a comfort zone (in this example, the risk zone may be acceptable and the danger zone should be avoided—otherwise the ability to read documents could be lost).

As described herein are techniques to: (a) avoid entering the danger zone; (b) exit from the danger zone after entering into the danger zone.

Referring now to FIGS. 12-16, various graph examples related to readability of file types are shown (FIG. 12 shows an overview and FIGS. 13-16 show various scenarios). In these examples, readability of file types can be measured in percent of users which have a required program installed being able to read a certain document type. Readability can be measured on different levels. For example: (a) on general entity level, (b) drilling down every scenario until specific file type/repository/user group—combination granularity level is reached. A rule of thumb: the entity needs on a highest level to have a good readability percentage. Poorer readability on more granular levels may be accepted as business risks (equal to longer time and more cumbersome for individual users to read, but overall still usable).

In one specific example, readability can be divided into three groups: (a) Comfort zone: Most to enough users are able to read documents of a certain file type. No action required; (b) Risk zone: Still many users can read a certain file type, but already many users will fail. These users need assistance. Time to read might significantly increase; (c) Danger zone: Only few users have ability to read. The entity overall is in danger of losing capability to read a certain file type. Action is required.

As described herein, the more programs which can open a specific file type, the higher is the readability of this file type (e.g. .csv). In one specific example, a goal is to ensure that readability of file types is possible until maximal retention of documents within a repository of a respective entity. With lower readability percentage the speed for end users to read may be slower (this may be acceptable as older documents are typically not that frequently read).

As described herein, mechanisms are provided to monitor readability of file types and to be able to drill down by repository, user group, all users, and/or number of documents.

Referring now to FIGS. 17-22, various cockpit dashboard examples related to readability of file types are depicted. As seen, numerous cockpit dashboards can be generated showing the readability health of a given entity.

In one specific example, the more drilled down, the more user-friendly the cockpit dashboard gets. In another specific example, it might be accepted that certain areas in drilled down views remain in red, that is, danger zone (shown in these Figs. as "X"), as long as the overall chart shows green, that is, comfort zone (shown in these Figs. as "Y" (a risk zone is shown in these Figs. as "Z"—corresponding to yellow)). This could mean, for example, that specific user groups might no longer be able to read a given file type (in case of a need to read, popup messages asking for help may be presented and directed to users who are able to read the given file type).

Specific high-level examples of various cockpit dashboards are shown in FIGS. 17-22. In these examples, all values associated with the cockpit dashboard may use the theory of sets (e.g., individual users may have installed several applications; also individual users may belong to multiple groups—because of these intersections the theory of sets may need to be applied (that is, to avoid incorrect results).

Referring now in particular to FIG. 17, in this example an overall entity dashboard is shown. The dashboard shows the entity readability health for file types overall. With this high-level dashboard the overall readability health can be judged (despite being green—as indicated in these Figs. as Y (that is, in the comfort zone) for a given file type, some individual users might not be able to read specific file types).

Referring now in particular to FIG. 18, in this example the approximated number of remaining documents in future times can be used to help to judge (e.g., by a system administrator) whether a file type should be converted or not (this may also help to determine the effort of conversion).

Figure 19:
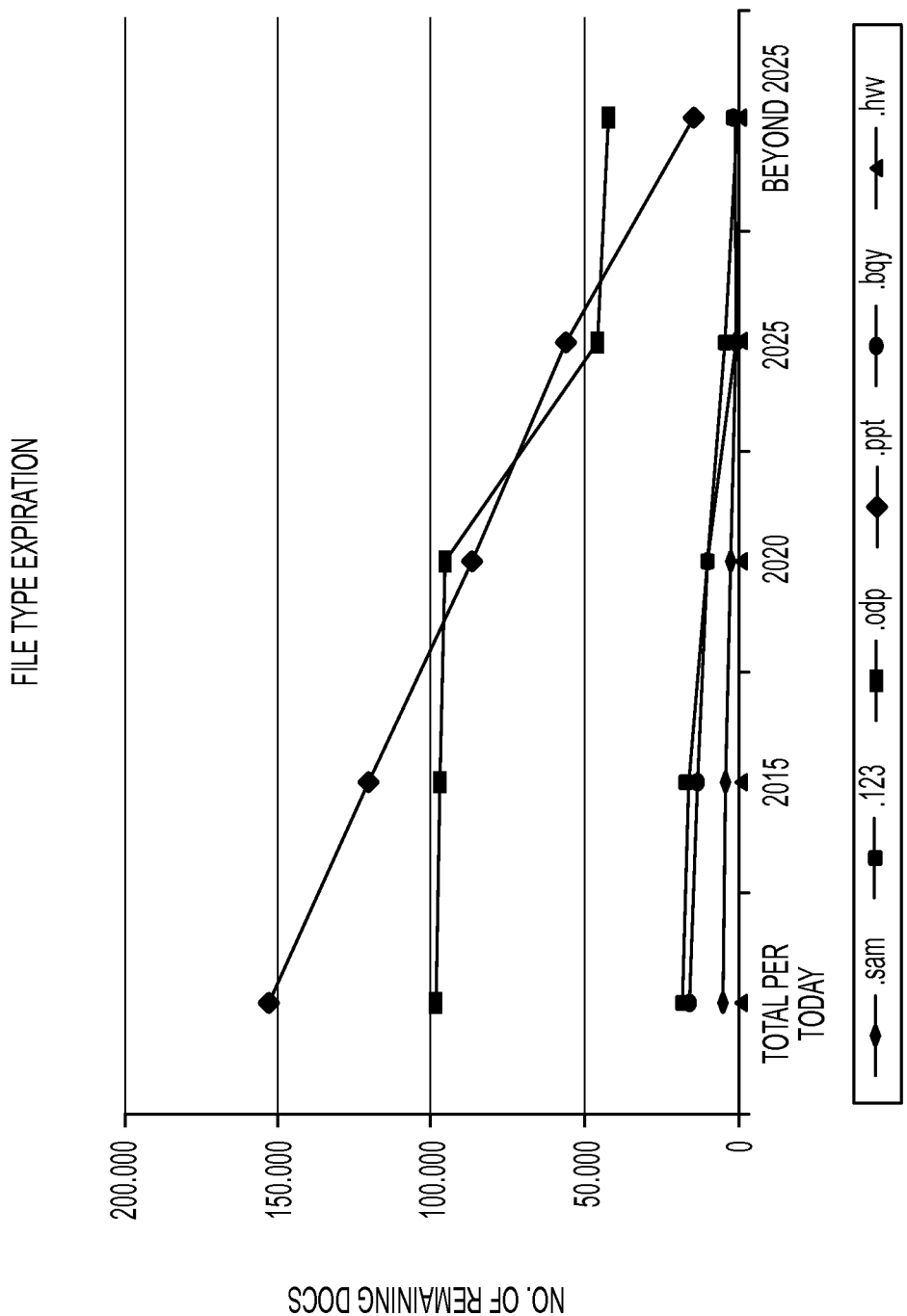

Referring now in particular to FIG. 19 (showing a plot of number of remaining documents on the y-axis vs. time on the x-axis), in this example values could be shown in graphics to see where a file type conversion makes sense, and where business risk might be taken (in one specific example, each file type may be shown in a particular color; in another specific example, the readability zone color associated with each particular file type may be shown).

Referring now in particular to FIG. 20 (which uses the "X", "Y", "Z" nomenclature discussed herein), in this example readability statements that are more granular per file type and document repository users can be made (in this regard, see e.g., the example of FIG. 20 and file type .bqy—Different content management systems may have different user groups. So it can result that in this example the readability zone for content management system A is in risk zone (e.g. 27%), while for the same file type it is for content management system C in comfort zone (e.g. 63%).

Referring now in particular to FIG. 21 (which uses the "X", "Y", "Z" nomenclature discussed herein), in this example the cockpit dashboards can be arranged in multiple ways—e.g., highlighting different perspectives on the readability health.

Referring now in particular to FIG. 22 (which uses the "X", "Y", "Z" nomenclature discussed herein), in this example the cockpit dashboards could be drilled down, for example, to user group readability health level (further granularity may require approval in some countries).

Figure 23:
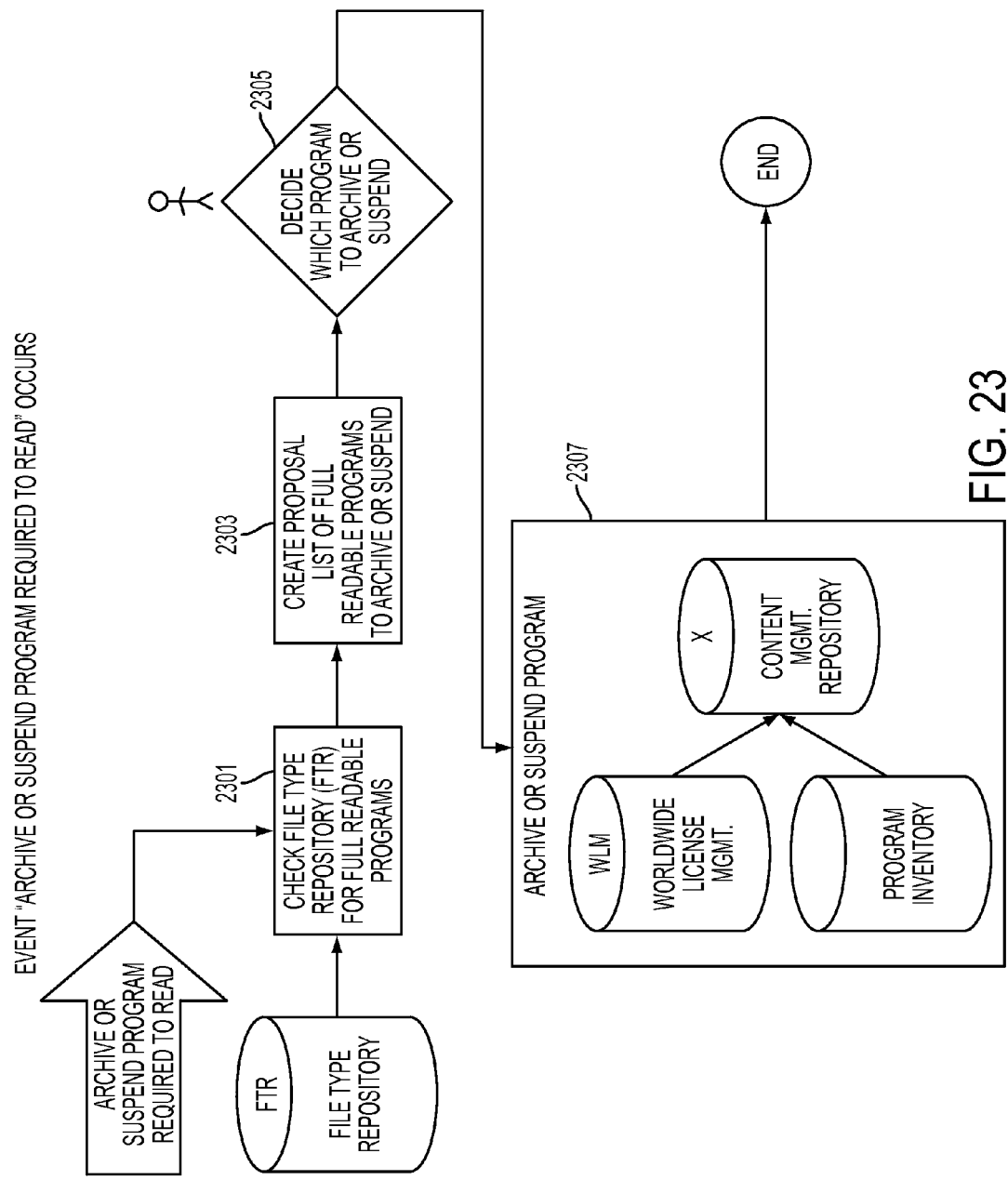
FIG. 23 depicts a block diagram of an operation according to an embodiment.

Referring now to FIG. 23, a block diagram of an operation according to an embodiment is shown. As seen in this FIG. 23, the operation relates to the occurrence of an event "Archive or suspend program required to read. More particularly, it is seen that at step 2301 a File Type Repository is checked for full readable programs when the event occurs. Further, at step 2303, a proposal list of full readable programs to archive or suspend is created and at step 2305 it is decided which program(s) to archive or suspend. Finally, at step 2307, the program(s) are archived or suspended.

Figure 24:
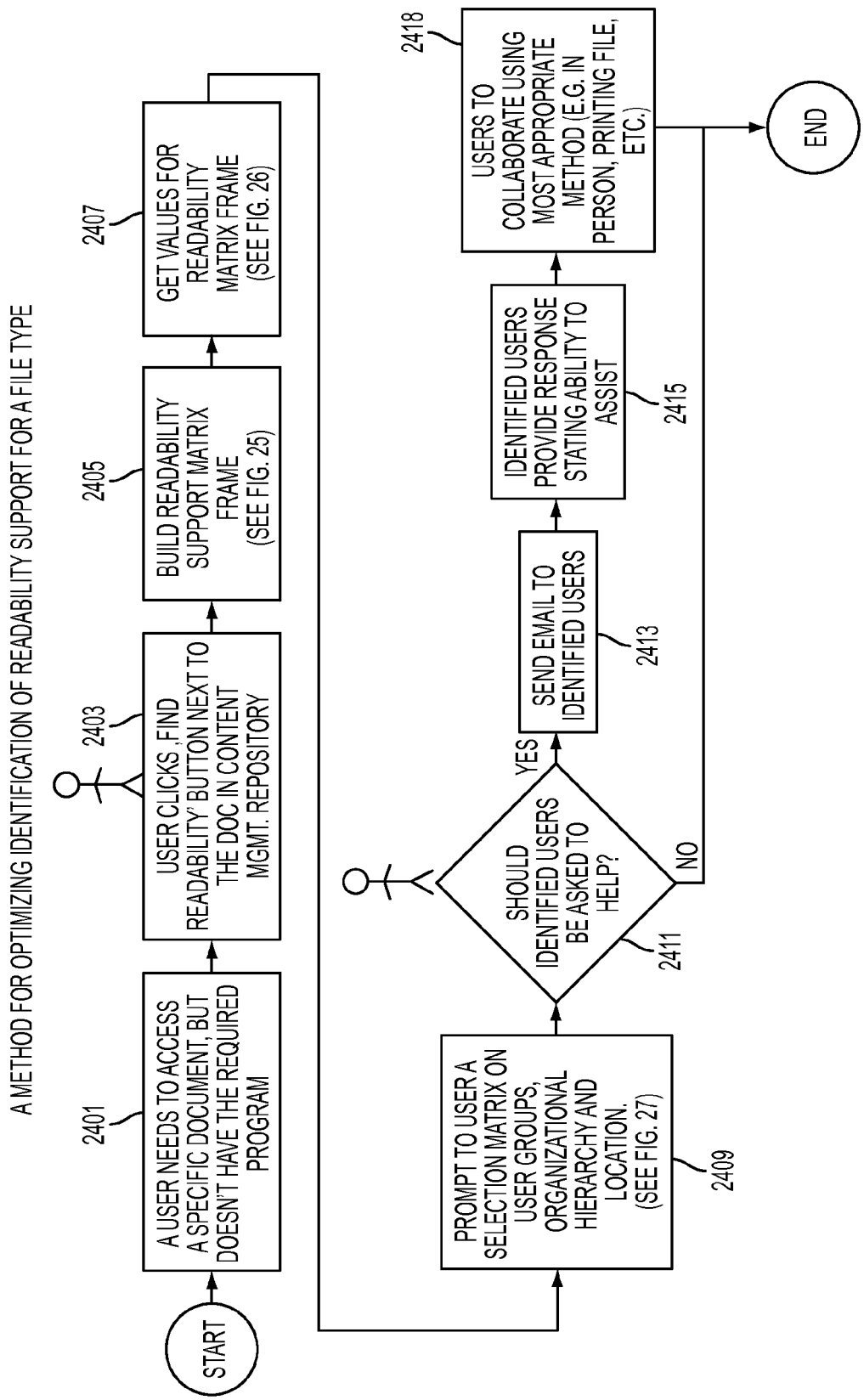
FIGS. 24-26 depict block diagrams of an operation according to an embodiment.
Figure 25:
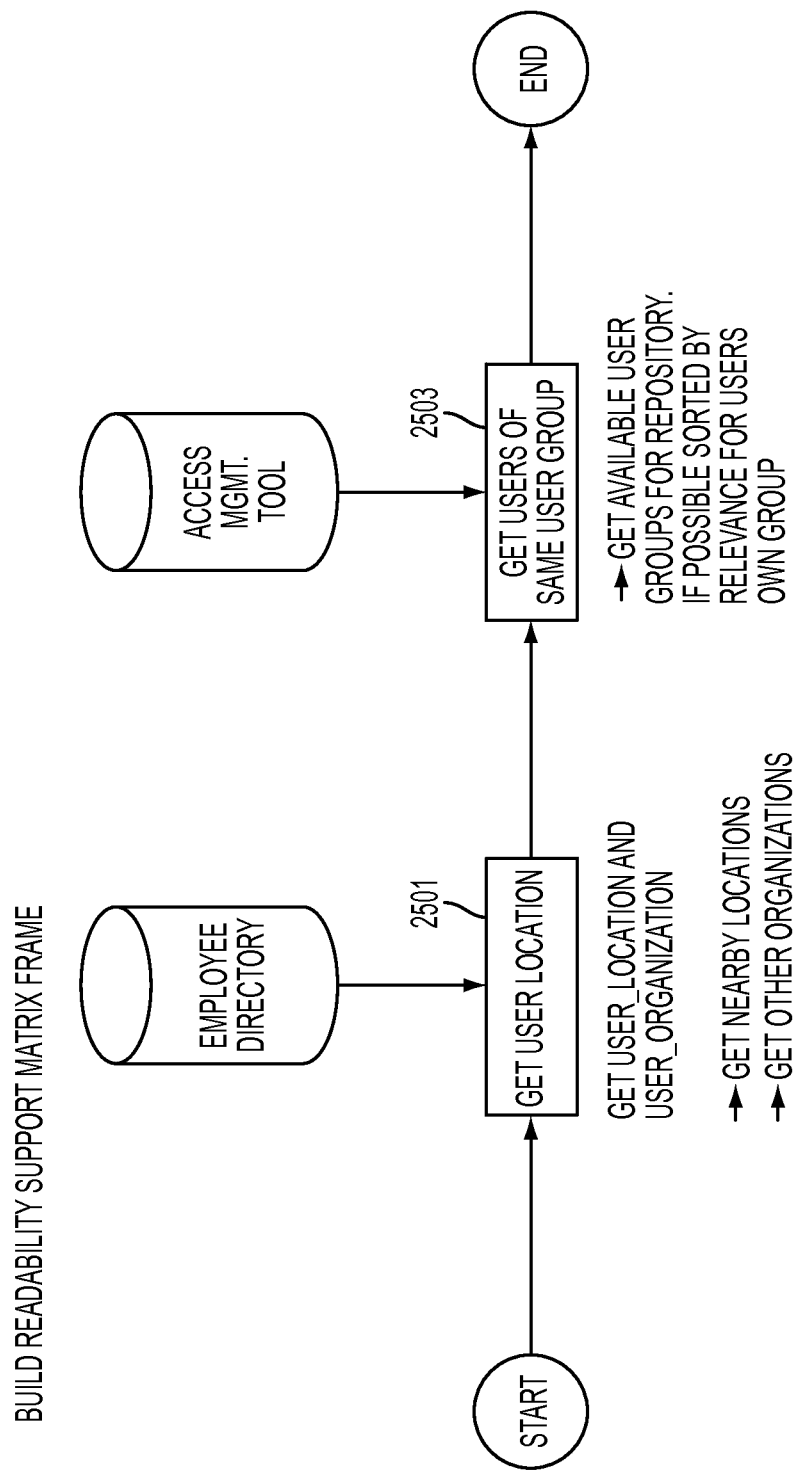
Figure 26:
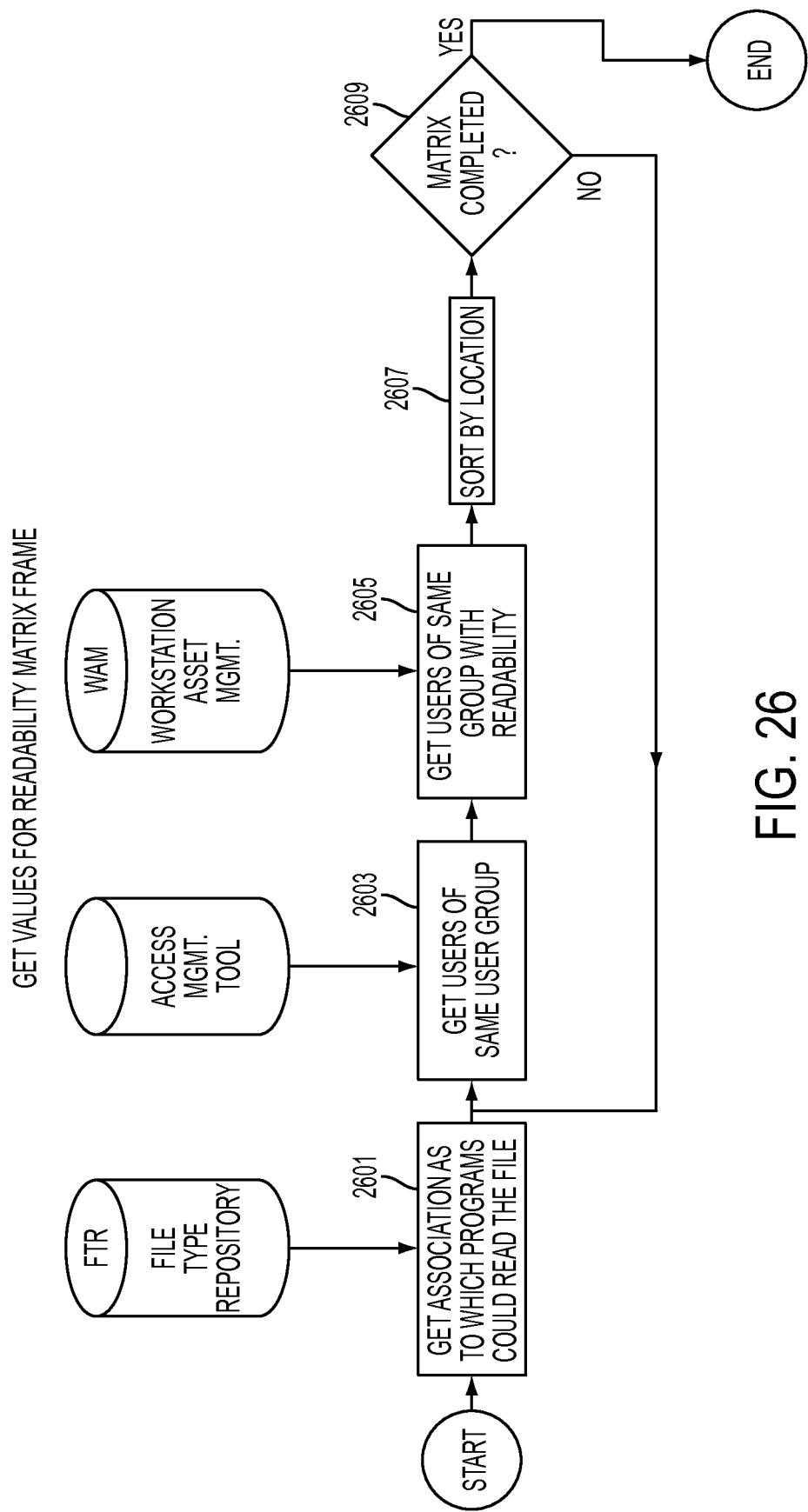

Referring now to FIGS. 24-26, block diagrams of an operation according to an embodiment is shown. As seen in these FIGS. 24-26, the operation relates to optimizing identification of readability support for a file type. More particularly, it is seen that at step 2401 a user needs to access a specific document, but doesn't have the required program. At step 2403 the user clicks "Find Readability" button next to the doc in Content Mgmt. Repository. At step 2405 a Readability Support Matrix is built (see also FIG. 25). At step 2407 values for Readability Matrix are obtained (see also FIG. 26). At step 2409 the user is prompted to make a selection of another user to provide help to read a file (see, e.g., FIGS. 27-29). At step 2411 a determination is made by a user who needs help to read a file whether to ask for help. At step 2413 email(s) are sent. At step 2415 response(s) are provided. Finally, at step 2418 collaboration is made.

Referring now to FIG. 25, it is seen that a Readability Support Matrix may be built by: step 2501—getting various locations and setp 2503—getting various users.

In one specific example, a Readability Support Matrix may be built as follows: User John wants to read a file type on his computer, however he does not have a program to read it. A query is done to the database that stores who's computer may still have a program that can read the file type John wants to open. There may be many computer programs with many users in his company that can open a file type like that. A possible matrix of people and programs would be provided back to John with someone and the name of the program that can open that file type for him.

Referring now to FIG. 26, it is seen that values for a Readability Support Matrix may be obtained by: step 2601—getting association as to which programs could read the file; step 2603—getting users of same user group; step 2605—getting users of same user group with readability; and step 2607—sorting by location. Finally, at step 2609 it is determined whether to iterate or end.

Figure 28:
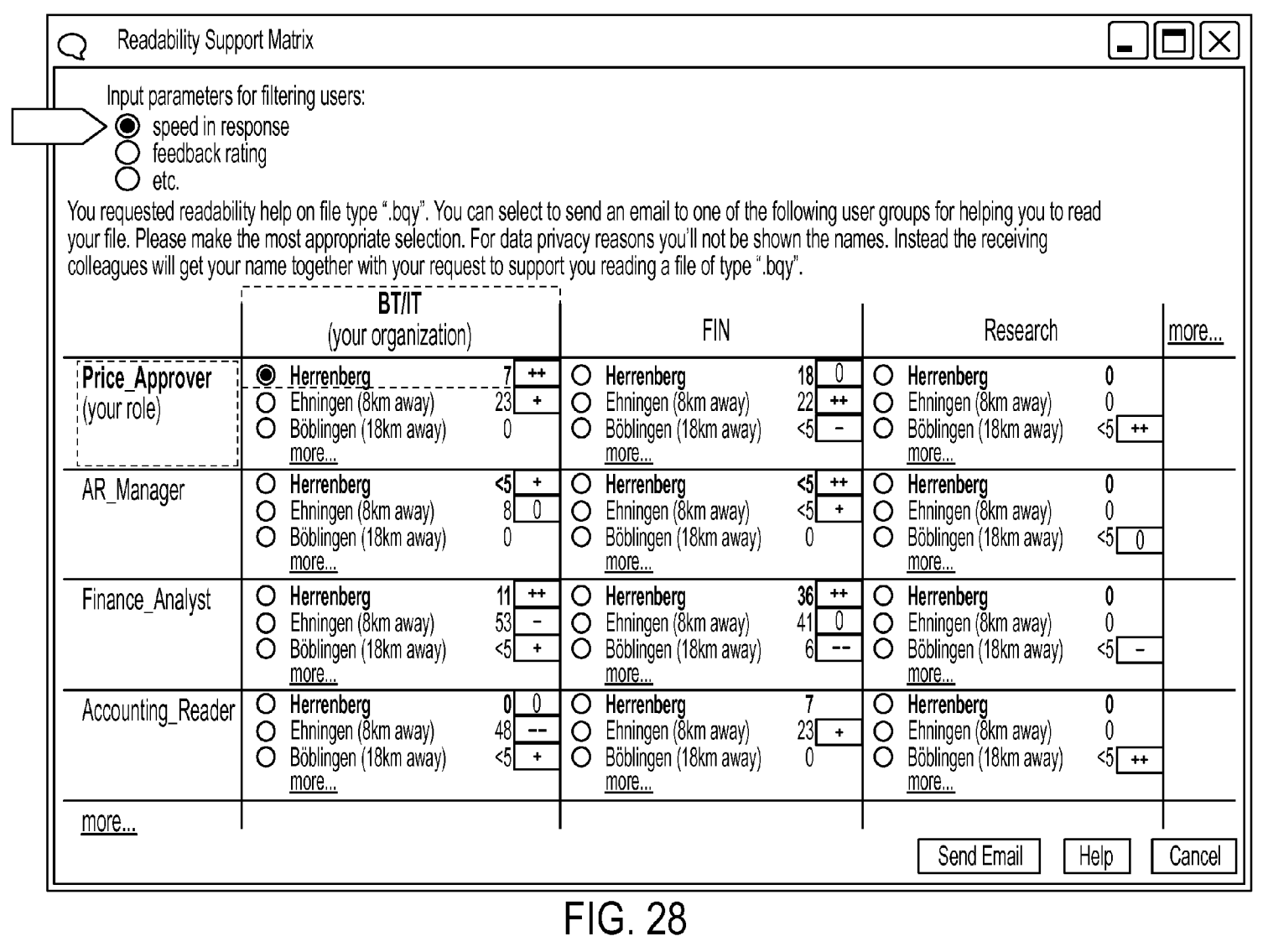
Figure 29:
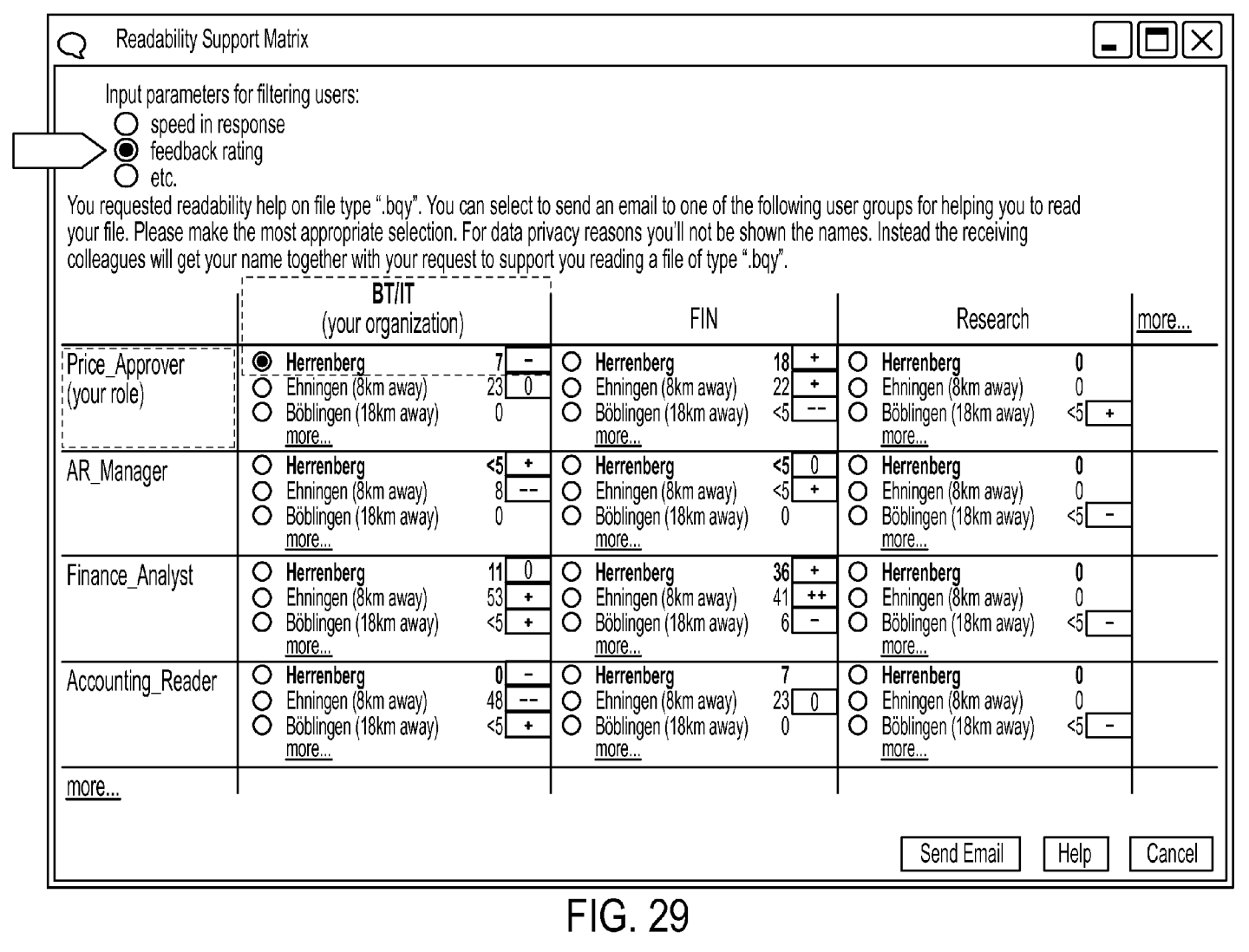

Referring now to FIGS. 27-29, a number of example screenshots for a Readability Support Matrix are shown. More particularly, with reference first to FIG. 27, it is seen that a user may be provided with a graphical user interface to select which of a number of parties may be contacted to provide help in reading a file (in this example, the user may be given an option to send an email to a selected party, wherein names of possible helping parties are not shown (to protect privacy) but, rather, locations are shown).

With reference now to FIG. 28, an example Readability Support Matrix similar to that of FIG. 27 is shown (in this FIG. 28, potential helping parties are filtered by speed in response—indicia may be provided indicating a response speed (e.g., an historical response speed) for each potential helping party).

With reference now to FIG. 29, an example Readability Support Matrix similar to that of FIG. 27 is shown (in this FIG. 29, potential helping parties are filtered by feedback rating—indicia may be provided indicating a feedback value (e.g., an historical feedback value) for each potential helping party).

In another example, a tracking history of readability support requests may be maintained with the goal of providing users better feedback.

In another example, an administrator may be informed when help requests occurred, in which locations, and/or for which user groups. The administrator may ask in follow-up questions how successful the help was. This process could provide information to the administrator such as, for example, whether in a certain location and/or for certain user groups there is a need to act (e.g., despite a readability calculation in a particular zone).

In another example, input parameters for filtering and/or displaying potential helping parties may include (but not be limited to): speed in response, feedback rating and/or historical response from a given user. In one specific example, an output based upon the input parameters may comprise a weighted list.

In another example, when notification goes out for assistance in reading a file the system may record: (a) response of the assistor (e.g., Accept/Reject/No Response); (b) elapsed time between request and response; and/or optional feedback provided by requestor. In one specific example, this data may be fed back into an analysis engine (e.g., a software analysis engine) and used to rank potential assistors in future searches.

Figure 30:
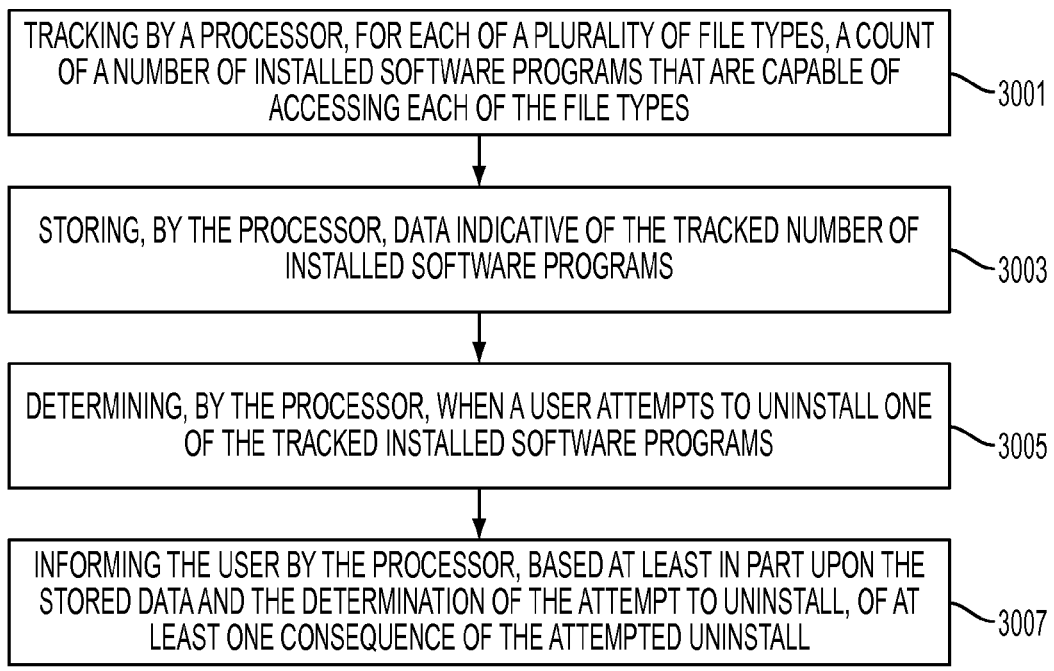
FIG. 30 depicts a flowchart of a method according to an embodiment.

Referring now to FIG. 30, a method for ensuring access to long-term stored electronic documents is shown. As seen in this FIG. 30, the method of this embodiment comprises: at 3001—tracking by a processor, for each of a plurality of file types, a count of a number of installed software programs that are capable of accessing each of the file types; at 3003—storing, by the processor, data indicative of the tracked number of installed software programs; at 3005—determining, by the processor, when a user attempts to uninstall one of the tracked installed software programs; and at 3007—informing the user by the processor, based at least in part upon the stored data and the determination of the attempt to uninstall, of at least one consequence of the attempted uninstall.

In one example, any steps described above may be carried out in any appropriate desired order.

Figure 31:
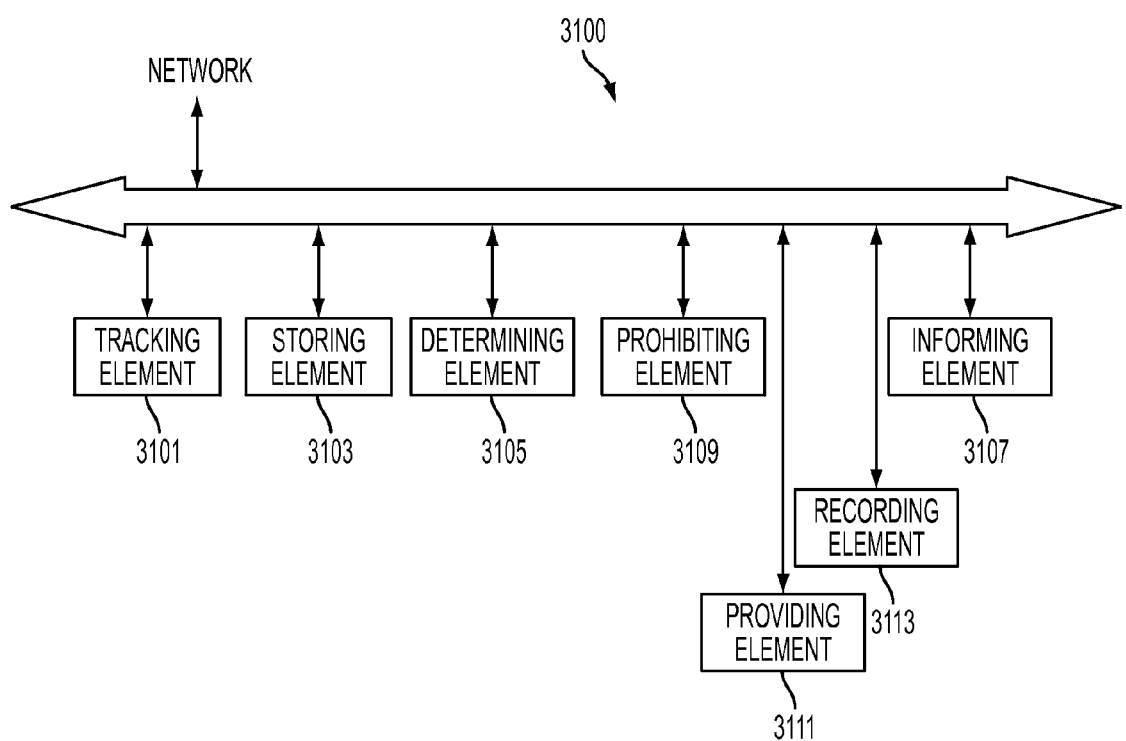
FIG. 31 depicts a block diagram of a system according to an embodiment.

Referring now to FIG. 31, in another embodiment, a system 3100 for ensuring access to long-term stored electronic documents is provided. This system may include the following elements: a tracking element 3101 configured to track, for each of a plurality of file types, a count of a number of installed software programs that are capable of accessing each of the file types; a storing element 3103 configured to store data indicative of the tracked number of installed software programs; a determining element 3105 configured to determine when a user attempts to uninstall one of the tracked installed software programs; an informing element 3107 configured to inform the user, based at least in part upon the stored data and the determination of the attempt to uninstall, of at least one consequence of the attempted uninstall; a prohibiting element 3109 configured to prohibit the user from completing the attempted uninstall; a providing element 3111 configured to provide to the user an indication of a source of assistance in accessing a given file type; and a recording element 3113 configured to record historical data regarding assistance provided.

In one example, communication between and among the various components of FIG. 31 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 32.

Figure 32:
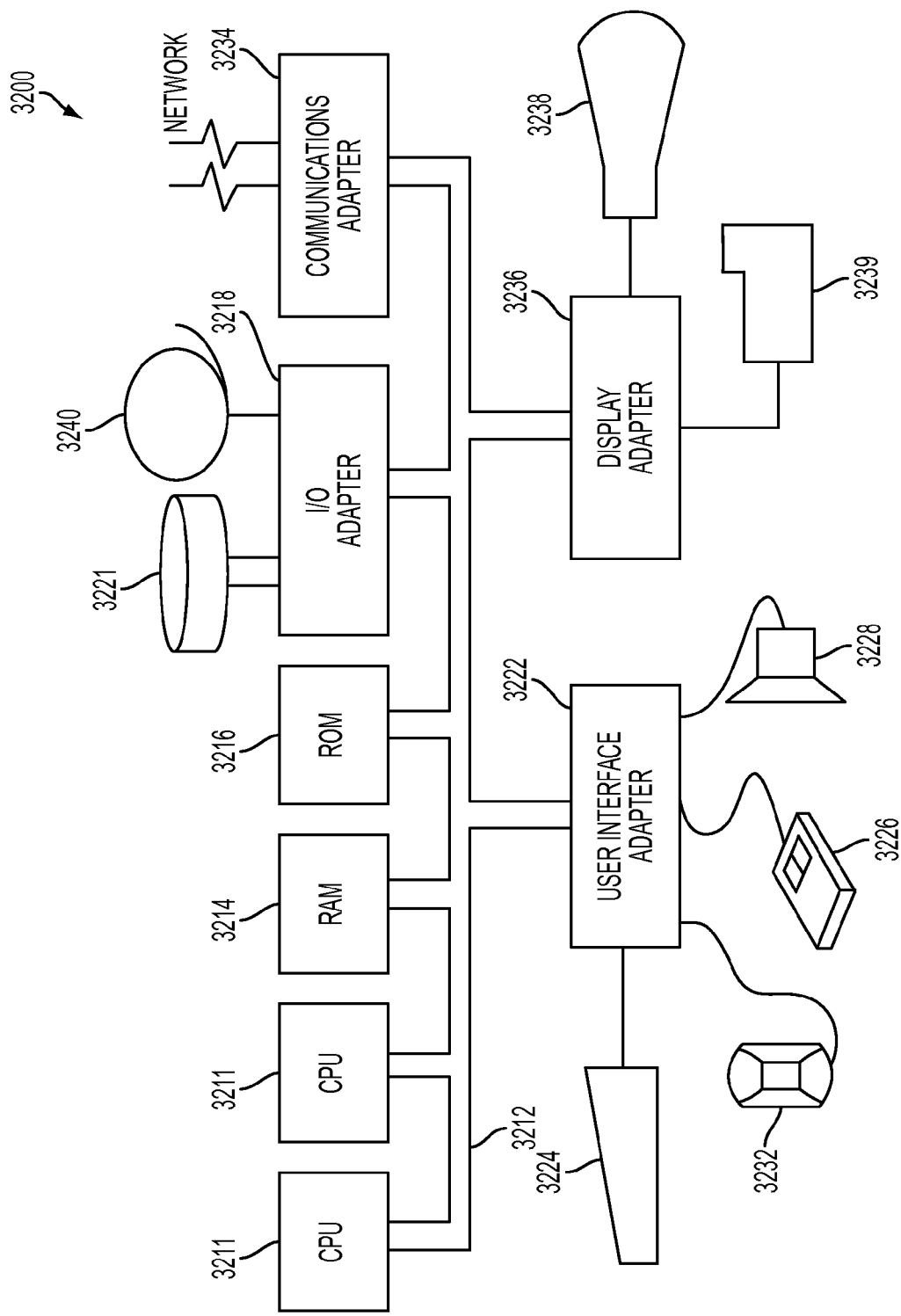
FIG. 32 depicts a block diagram of a system according to an embodiment.

Referring now to FIG. 32, this figure shows a hardware configuration of computing system 3200 according to an embodiment of the present invention. As seen, this hardware configuration has at least one processor or central processing unit (CPU) 3211. The CPUs 3211 are interconnected via a system bus 3212 to a random access memory (RAM) 3214, read-only memory (ROM) 3216, input/output (I/O) adapter 3218 (for connecting peripheral devices such as disk units 3221 and tape drives 3240 to the bus 3212), user interface adapter 3222 (for connecting a keyboard 3224, mouse 3226, speaker 3228, microphone 3232, and/or other user interface device to the bus 3212), a communications adapter 3234 for connecting the system 3200 to a data processing network, the Internet, an Intranet, a local area network (LAN), etc., and a display adapter 3236 for connecting the bus 3212 to a display device 3238 and/or printer 3239 (e.g., a digital printer or the like).

As described herein mechanisms are provided to ensure documents can be read by employing the following techniques: (1) inform a user of consequences when uninstalling an application (e.g., providing a given user an indication about how many programs are available to read/execute one or more documents on the user's system, the indication comprising a risk assessment about executing/accessing the documents if the user deletes a given program); (2) track the number of software programs that are installed over a base user population; (3) create links between documents and programs (e.g., create links between one or more documents and one or more programs that use the documents); (4) track the links between readability programs and number of files in the base user population; (5) optimize a list of end users who are able to assist with rendering a document in a current format (e.g., using an appropriate program); and/or (6) recording historical data regarding assistance provided.

In one specific example, mechanisms to inform a user of consequences when uninstalling an application (see (1) above) include: (A) user selects to uninstall a document rendering application from his workstation; (B) a check is made to determine if this application is on a watch list (e.g., via the linking techniques described herein); (C) if the application is on the watch list then the user is informed of implications of removing the application.

In one specific example: (A) if the application is in a comfort zone then allow the uninstall to occur without interruption; (B) if the application is in a risk zone then prompt the user to re-consider the action to uninstall (if a program is no longer installed on user's workstation (e.g., because he changed workstations) then email the user to consider installing that program again); (C) if the application is in a danger zone then prevent uninstallation (e.g., assuming a corporate asset).

In one specific example, mechanisms to track the number of software programs that are installed over a base user population (see (2) above) include: (A) a software agent on each users' workstation detects presence of targeted document viewing application; (B) software agents update database which maintains installation location data for targeted document viewing applications.

In another specific example, assuming a document repository system exists, mechanisms to track the number of software programs that are installed over a base user population (see (2) above) include: (A) monitor when users add a new file to a document repository; (B) when a new document is added: (i) detect its file type (e.g., .doc, .pdf. odf); (ii) detect registered extension database on each user's workstation to determine which programs can handle that document type; (iii) interrogate each user's operating system (OS) for program metrics (e.g., name of program, install date) and send to centralized database; (iv) optional step—tag the installed program with meta data that can be queried upon an uninstall request so that action can be taken to notify the end user (see notification techniques described herein).

In one specific example, mechanisms to create links between documents and programs (see (3) above) include the following (the operating system may require additional functionality to support these steps): (A) the OS monitors for the creation of a new file in the file system; (B) when a new document is created the OS: (i) adds metadata to the document's "program array" that describes which program created the file or if no program was used to create the file then record the default program associated with that file type; (ii) adds metadata to the document's "program array" that describes the program's installed location (e.g., identifies user, machine, IP address, etc); (iii) add the name of the file (e.g., with local or remote path) to a "document array" stored within (or otherwise associated with) the program (or, in another embodiment, increment a file creation counter in the embedded array); (B) when an existing document is modified or deleted: (i) scan the meta data that shows which program created it; (ii) update the program's "document array" as appropriate—either update the path/location if stored or remove the entry if the document is being deleted; (D) when an existing program is modified or deleted: (i) scan the program's "document array" and determine the appropriate action: (a) if the program is being deleted check if the document array is empty—if not then implement "Method to inform a user of consequences when uninstalling an application"; (b) if the program is allowed to be uninstalled then parse the program's "document array" and update each linked document's "program array" to indicate that the program has been uninstalled.

In one specific example, mechanisms to track the links between readability programs and number of files in the base user population (see (4) above) include: (A) a central service will query the documents in the document repository and scan each documents "program array" meta data to: (i) determine which program(s) are linked to each document; (ii) determine those programs' locations (which is stored in the "program array"); (iii) determine those programs' install state (which is stored in the "program array"); (B) return a report showing the statistics related to the metrics collected (e.g. ratio of documents to number of unique program installations, etc).

In one specific example, mechanisms to optimize a list of end users who are able to assist with rendering a document in a current format (see (5) above) include: (A) retrieve list of programs capable of reading the given file type; (B) using an access management tool, apply search criteria to select population of users who can access the document; (C) using a workstation asset management tool determine users from previous step who have required document reading program installed; (D) apply any appropriate sorting and provide requestor with result matrix.

In one specific example, mechanisms for recording historical data regarding assistance provided (see (6) above) include: (A) sending request for assistance to review a document to a user; (B) keeping track of user's response (e.g., Accept/Reject/No Response); (C) track elapsed time between request and resolution; (D) collect feedback from requester regarding his experience; (E) use collected historical data to provide better ranking of potential assistors for future requests.

In other examples, embodiments may be used in connection with file hosting services. For example, users storing documents with a file hosting service which does not impose a file type restriction (e.g. DROPBOX) may need to preserve readability of their documents. Possible variations to retain readability include (but are not limited to): (a) Service provides a temporary downloadable license of the software required to read the document. In this case, the Service Provider maintains one or more licenses for the required software. When the Requestor is finished with the software or a pre-determined time period has elapsed, the software license expires, the installed version becomes unusable or is automatically removed and the license is returned to the pool; (b) Service provides access to a cloud-based instance of the software required to read the document. In this case, the Service Provider maintains one or more licenses for the required software. When the software is requested, the Service Provider provisions an instance of the software and makes it available to the Requestor. When the Requestor is finished with the software or a pre-determined time period has elapsed, the software instance is taken down and the license is returned to the pool; (c) Service Provider acts as a broker between the Requestor and a Reader who has an instance of the required software and is willing to provide this ability to the Requestor. The Requestor and Reader will agree upon the terms for accessing the document. Further, it could also be analyzed whether there is an existing association between the Requestor and Reader.

In other examples, broadening to physical tools (e.g., hardware components) may be provided.

As described herein, various embodiments may be used by any appropriate entity. In one example, such an entity may be using one or more Enterprise Content Managing Systems (e.g., IBM Content Manager and/or IBM FileNet P8). In another example, such an entity may be using/maintaining one or more archives.

As described herein, under various embodiments: a user can trust that documents will be readable for the entire life cycle of a document; the solution method is of general nature, independent of specific file formats; and/or the solution only needs to be established once globally (or possibly twice for backup reasons).

As described herein, various embodiments provide for active bidirectional links; and/or embedded viewers.

As described herein, various embodiments allow electronic documents to be read long after a product has been sunset (20-100 years as an example). Through intelligent monitoring actions can be taken to keep required programs for reading long-term stored documents above a defined threshold in a given user community. If the number of installed programs falls below another defined threshold action for permanent viewing options (e.g., converting or embedding viewer) may be taken. In various examples these techniques keep file size storage requirements to a minimum (because, in one example, a document is not converted until a given threshold has been met). In various examples these techniques allow document storage in the native format as long as a given document has a good readability index. In various examples these techniques prevent storing all documents additionally in another format (therefore such techniques may require significantly less long-term storage capacity compared to other methods).

In one embodiment, an implementation (involving two inter-coordinated elements) may be as follows: within an entity a guideline is established regarding which current file types are to be long term readable; either at end of general support by a vendor/publisher for a specific file type (or at another time that an entity defines—e.g., based upon on company rational) that specific file type should be reported to all long-term storing repositories within the entity as having support ended. In one specific example a central function may be used to read an unsupported file type and return a document in a supported format to a user.

As described herein, various embodiments may operate in the context of: (a) Computer: Software; (b) Computer: Storage or storage management; (c) Consumer Device or Appliance: Media Software Content applications; (d) Software: Data access, analysis, and delivery; (e) Document and web content management; and/or (f) Information Management: Enterprise Content Management Systems.

As described herein, various embodiments may provide for: GUI dashboards; monitoring; and/or conversion of files after archival.

As described herein, various embodiments may provide for: sending emails to users (and/or otherwise communicating such as via warning messages or prompts) after actual or attempted program uninstallation has been recognized (e.g., after change of workstation); making the user aware of the consequences (e.g., if the user is made aware of the consequences and the user is able and willing to reinstall the program then the readability again rises).

As described herein, various embodiments may provide for maintaining readability apart from the person who created a given document (e.g, the creator of a document may not necessarily be the person who has a long-term need to read it again).

In one embodiment, a method for ensuring access to long-term stored electronic documents is provided, the method comprising: tracking by a processor, for each of a plurality of file types, a count of a number of installed software programs that are capable of accessing each of the file types; storing, by the processor, data indicative of the tracked number of installed software programs; determining, by the processor, when a user attempts to uninstall one of the tracked installed software programs; and informing the user by the processor, based at least in part upon the stored data and the determination of the attempt to uninstall, of at least one consequence of the attempted uninstall.

In one example, the tracking is carried out over a user population comprising one of: (a) all of a plurality of users associated with a given organization; and (b) a subset of a plurality of users associated with a given organization.

In another example, the accessing each of the file types comprises at least one of: (a) reading a document of a given file type; (b) writing a document of a given file type; and (c) creating a document of a given file type.

In another example, the determination is made via use of at least one software agent.

In another example, the informing the user of the at least one consequence of the attempted uninstall comprises indicating to the user that the user will no longer have the capability to access a given file type.

In another example, the method further comprises prohibiting, by the processor, the user from completing the attempted uninstall.

In another example, the method further comprises providing to the user, by the processor, an indication of a source of assistance in accessing a given file type.

In another example, the method further comprises recording, by the processor, historical data regarding assistance provided.

In another embodiment, a computer readable storage medium, tangibly embodying a program of instructions executable by the computer for ensuring access to long-term stored electronic documents is provided, the program of instructions, when executing, performing the following steps: tracking, for each of a plurality of file types, a count of a number of installed software programs that are capable of accessing each of the file types; storing data indicative of the tracked number of installed software programs; determining when a user attempts to uninstall one of the tracked installed software programs; and informing the user, based at least in part upon the stored data and the determination of the attempt to uninstall, of at least one consequence of the attempted uninstall.

In one example, the tracking is carried out over a user population comprising one of: (a) all of a plurality of users associated with a given organization; and (b) a subset of a plurality of users associated with a given organization.

In another example, the accessing each of the file types comprises at least one of: (a) reading a document of a given file type; (b) writing a document of a given file type; and (c) creating a document of a given file type.

In another example, the determination is made via use of at least one software agent.

In another example, the informing the user of the at least one consequence of the attempted uninstall comprises indicating to the user that the user will no longer have the capability to access a given file type.

In another example, the program of instructions, when executing, further performs the step of prohibiting the user from completing the attempted uninstall.

In another example, the program of instructions, when executing, further performs the step of providing to the user an indication of a source of assistance in accessing a given file type.

In another example, the program of instructions, when executing, further performs the step of recording historical data regarding assistance provided.

In another embodiment, a computer-implemented system for ensuring access to long-term stored electronic documents is provided, the system comprising: a tracking element configured to track, for each of a plurality of file types, a count of a number of installed software programs that are capable of accessing each of the file types; a storing element configured to store data indicative of the tracked number of installed software programs; a determining element configured to determine when a user attempts to uninstall one of the tracked installed software programs; and an informing element configured to inform the user, based at least in part upon the stored data and the determination of the attempt to uninstall, of at least one consequence of the attempted uninstall.

In one example, the tracking is carried out over a user population comprising one of: (a) all of a plurality of users associated with a given organization; and (b) a subset of a plurality of users associated with a given organization.

In another example, the accessing each of the file types comprises at least one of: (a) reading a document of a given file type; (b) writing a document of a given file type; and (c) creating a document of a given file type.

In another example, the determination is made via use of at least one software agent.

In another example, the informing the user of the at least one consequence of the attempted uninstall comprises indicating to the user that the user will no longer have the capability to access a given file type.

In another example, the system further comprises a prohibiting element configured to prohibit the user from completing the attempted uninstall.

In another example, the system further comprises a providing element configured to provide to the user an indication of a source of assistance in accessing a given file type.

In another example, the system further comprises a recording element configured to record historical data regarding assistance provided.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A non-transitory computer readable storage device, tangibly embodying a program of instructions executable by the computer for ensuring access to long- term stored electronic documents, the program of instructions, when executing, performing the following steps:

tracking, for each of a plurality of file types, a count of a number of installed software programs that are capable of accessing each of the file types;

storing data indicative of the tracked number of installed software programs, the stored data including for each of the plurality of file types the count of the number of installed software programs that are capable of accessing each of the file types;

determining when a user attempts to uninstall one of the tracked installed software programs; and informing the user, based at least in part upon the stored data including for each of the plurality of file types the count of the number of installed software programs that are capable of accessing each of the file types and the determination of the attempt to uninstall, of at least one consequence of the attempted uninstall;

wherein the program of instructions, when executing, further performs the step of providing to the user an indication of a source of assistance in accessing a given file type; and wherein the program of instructions, when executing, further performs the step of recording historical data regarding assistance provided; and wherein the program of instructions, when executing, further performs the step of providing to the user a GUI dashboard;

wherein the GUI dashboard is based at least in part upon the stored data including for each of the plurality of file types the count of the number of installed software programs that are capable of accessing each of the file types; and wherein the GUI dashboard indicates into which one of a plurality of zones each of the plurality of file types belongs based upon the count of the number of installed software programs that are capable of accessing each of the file types; and the plurality of zones comprises a first zone, a second zone and a third zone;

the first zone is a comfort zone having, relative to the second and third zones, a highest count of the number of installed software programs that are capable of accessing a given file type;

the second zone is a risk zone having, relative to the first and third zones, a middle count of the number of installed software programs that are capable of accessing the given file type; and the third zone is a danger zone having, relative to the first and second zones, a lowest count of the number of installed software programs that are capable of accessing the given file type.

2. The non-transitory computer readable storage device of claim 1, wherein the tracking is carried out over a user population comprising one of: (a) all of a plurality of users associated with a given organization; and (b) a subset of a plurality of users associated with a given organization.

3. The non-transitory computer readable storage device of claim 1, wherein the accessing each of the file types comprises at least one of: (a) reading a document of a given file type; (b) writing a document of a given file type; and (c) creating a document of a given file type.

4. The non-transitory computer readable storage device of claim 1, wherein the determination is made via use of at least one software agent.

5. The non-transitory computer readable storage device of claim 1, wherein the informing the user of the at least one consequence of the attempted uninstall comprises indicating to the user that the user will no longer have the capability to access a given file type.

6. The non-transitory computer readable storage device of claim 1, wherein the program of instructions, when executing, further performs the step of prohibiting the user from completing the attempted uninstall.

7. The non-transitory computer readable storage device of claim 1, wherein the first zone is separated from the second zone by a first threshold; and wherein the second zone is separated from the third zone by a second threshold.

8. The non-transitory computer readable storage device of claim 1, wherein each of the zones is indicated by a graphic indicium.

9. The non-transitory computer readable storage device of claim 8, wherein:

the graphic indicium of the first zone is the color green;
   the graphic indicium of the second zone is the color yellow; and
   the graphic indicium of the third zone is the color red.

10. A computer-implemented system for ensuring access to long-term stored electronic documents, the system comprising:

a processor; and
   a memory storing computer-readable instructions that, when executed by the processor, implement:
   a tracking element configured to track, for each of a plurality of file types, a count of a number of installed software programs that are capable of accessing each of the file types;
   a storing element configured to store data indicative of the tracked number of installed software programs, the stored data including for each of the plurality of file types the count of the number of installed software programs that are capable of accessing each of the file types;

a determining element configured to determine when a user attempts to uninstall one of the tracked installed software programs; and an informing element configured to inform the user, based at least in part upon the stored data including for each of the plurality of file types the count of the number of installed software programs that are capable of accessing each of the file types and the determination of the attempt to uninstall, of at least one consequence of the attempted uninstall;

wherein the computer-readable instructions, when executed by the processor, further implement a providing element configured to provide to the user an indication of a source of assistance in accessing a given file type;

wherein the computer-readable instructions, when executed by the processor, further implement a recording element configured to record historical data regarding assistance provided;

wherein the computer-readable instructions, when executed by the processor, further implement a providing element configured to provide to the user a GUI dashboard;

wherein the GUI dashboard is based at least in part upon the stored data including for each of the plurality of file types the count of the number of installed software programs that are capable of accessing each of the file types; and wherein the GUI dashboard indicates into which one of a plurality of zones each of the plurality of file types belongs based upon the count of the number of installed software programs that are capable of accessing each of the file types; and the plurality of zones comprises a first zone, a second zone and a third zone;

the first zone is a comfort zone having, relative to the second and third zones, a highest count of the number of installed software programs that are capable of accessing a given file type;

the second zone is a risk zone having, relative to the first and third zones, a middle count of the number of installed software programs that are capable of accessing the given file type; and the third zone is a danger zone having, relative to the first and second zones, a lowest count of the number of installed software programs that are capable of accessing the given file type.

11. The system of claim 10, wherein the tracking is carried out over a user population comprising one of: (a) all of a plurality of users associated with a given organization; and (b) a subset of a plurality of users associated with a given organization.

12. The system of claim 10, wherein the accessing each of the file types comprises at least one of: (a) reading a document of a given file type; (b) writing a document of a given file type; and (c) creating a document of a given file type.

13. The system of claim 10, wherein the determination is made via use of at least one software agent.

14. The system of claim 10, wherein the informing the user of the at least one consequence of the attempted uninstall comprises indicating to the user that the user will no longer have the capability to access a given file type.

15. The system of claim 10, wherein the computer-readable instructions, when executed by the processor, further implement a prohibiting element configured to prohibit the user from completing the attempted uninstall.

16. The system of claim 10, wherein the first zone is separated from the second zone by a first threshold; and wherein the second zone is separated from the third zone by a second threshold.

17. The system of claim 10, wherein each of the zones is indicated by a graphic indicium.

18. The system of claim 17, wherein:
the graphic indicium of the first zone is the color green;
the graphic indicium of the second zone is the color yellow; and
the graphic indicium of the third zone is the color red.

* * * * *